(12) United States Patent
Matsuda et al.

(10) Patent No.: US 11,011,947 B2
(45) Date of Patent: May 18, 2021

(54) STATOR AND MANUFACTURING METHOD OF STATOR

(71) Applicant: DENSO CORPORATION, Kariya (JP)

(72) Inventors: Tsuyoshi Matsuda, Kariya (JP); Kazuhiro Miura, Kariya (JP); Yuuya Asai, Kariya (JP); Takashi Nagaya, Kariya (JP); Takumi Okano, Kariya (JP); Isoshi Soga, Kariya (JP); Kazuya Nagasaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 115 days.

(21) Appl. No.: 16/275,804

(22) Filed: Feb. 14, 2019

(65) Prior Publication Data

US 2019/0181699 A1  Jun. 13, 2019

Related U.S. Application Data

(63) Continuation of application No. PCT/JP2017/030221, filed on Aug. 24, 2017.

(30) Foreign Application Priority Data

Aug. 30, 2016 (JP) .............................. JP2016-167804
Jun. 5, 2017 (JP) .............................. JP2017-110944

(51) Int. Cl.
| | | |
|---|---|---|
| *H02K 21/26* | (2006.01) | |
| *H02K 1/17* | (2006.01) | |
| *H02K 15/03* | (2006.01) | |
| *H02K 1/18* | (2006.01) | |
| *F16B 2/08* | (2006.01) | |

(52) U.S. Cl.
CPC .................. *H02K 1/17* (2013.01); *F16B 2/08* (2013.01); *H02K 1/185* (2013.01); *H02K 15/03* (2013.01)

(58) Field of Classification Search
CPC .. H02K 1/17; H02K 5/08; H02K 5/00; H02K 1/185
USPC .............................. 310/89, 154.08, 400–433
See application file for complete search history.

(56) References Cited

U.S. PATENT DOCUMENTS

| | | | | |
|---|---|---|---|---|
| 2001/0048259 | A1* | 12/2001 | Ueda ...................... | H02K 1/17 |
| | | | | 310/154.09 |
| 2004/0113504 | A1* | 6/2004 | Agnes ..................... | H02K 5/08 |
| | | | | 310/154.08 |

FOREIGN PATENT DOCUMENTS

| | | |
|---|---|---|
| JP | S53090906 U | 7/1978 |
| JP | H06031354 U | 4/1994 |
| JP | 2005291367 A | 10/2005 |

* cited by examiner

*Primary Examiner* — Thanh Lam
(74) *Attorney, Agent, or Firm* — Harness, Dickey & Pierce, P.L.C.

(57) ABSTRACT

A stator includes a main yoke having a cylindrical shape with a bottom, an auxiliary yoke having a band shape arranged on an outer or inner circumferential wall surface of this main yoke, and a field magnet arranged inside the main yoke. The auxiliary yoke is arranged along a circumferential direction on the outer or inner circumferential wall surface of the main yoke. One end of the auxiliary yoke has at least one protrusion, and another end of the auxiliary yoke has at least one recess facing and engaging in a circumferential direction with the protrusion either on the inner or outer circumferential wall surface of the main yoke.

4 Claims, 16 Drawing Sheets

OUTPUT SIDE ←—•—→ BASE SIDE (a)

(b)

(a)

(b)

(c)

(a)

(b)

(a)

(b)

(a)

(b)

(a)

(b)

STATOR AND MANUFACTURING METHOD OF STATOR

CROSS REFERENCE TO RELATED APPLICATIONS

The present application is a continuation application of International Patent Application No. PCT/JP2017/030221 filed on Aug. 24, 2017, which designated the United States and claims the benefit of priority from Japanese Patent Applications No. 2016-167804 filed on Aug. 30, 2016, and No. 2017-110944 filed on Jun. 5, 2017. The entire disclosures of all of the above applications are incorporated herein by reference.

TECHNICAL FIELD

The present disclosure relates to a stator and a manufacturing method of the stator.

BACKGROUND

A frame structure of a DC motor includes a rotor core enclosed in a frame (yoke) having a cup shape, and an auxiliary frame having a ring shape is arranged on a cylindrical outer surface of this frame.

SUMMARY

According to the present disclosure, a stator includes: a main yoke having a cylindrical shape with a bottom; an auxiliary yoke having a band shape and arranged on an outer circumferential wall surface or an inner circumferential wall surface of the main yoke; and a field magnet arranged inside the main yoke and radially facing an outer surface of the armature. The auxiliary yoke is arranged along a circumferential direction of the outer circumferential wall surface or the inner circumferential wall surface of the main yoke. The auxiliary yoke has at least one protrusion formed at one end thereof. The auxiliary yoke has at least one recess formed at another end thereof. The recess faces and engages with the protrusion in the circumferential direction in a state where the auxiliary yoke is arranged along the circumferential direction of the outer circumferential wall surface or the inner circumferential wall surface of the main yoke.

DETAILED DESCRIPTION

Figure 1:
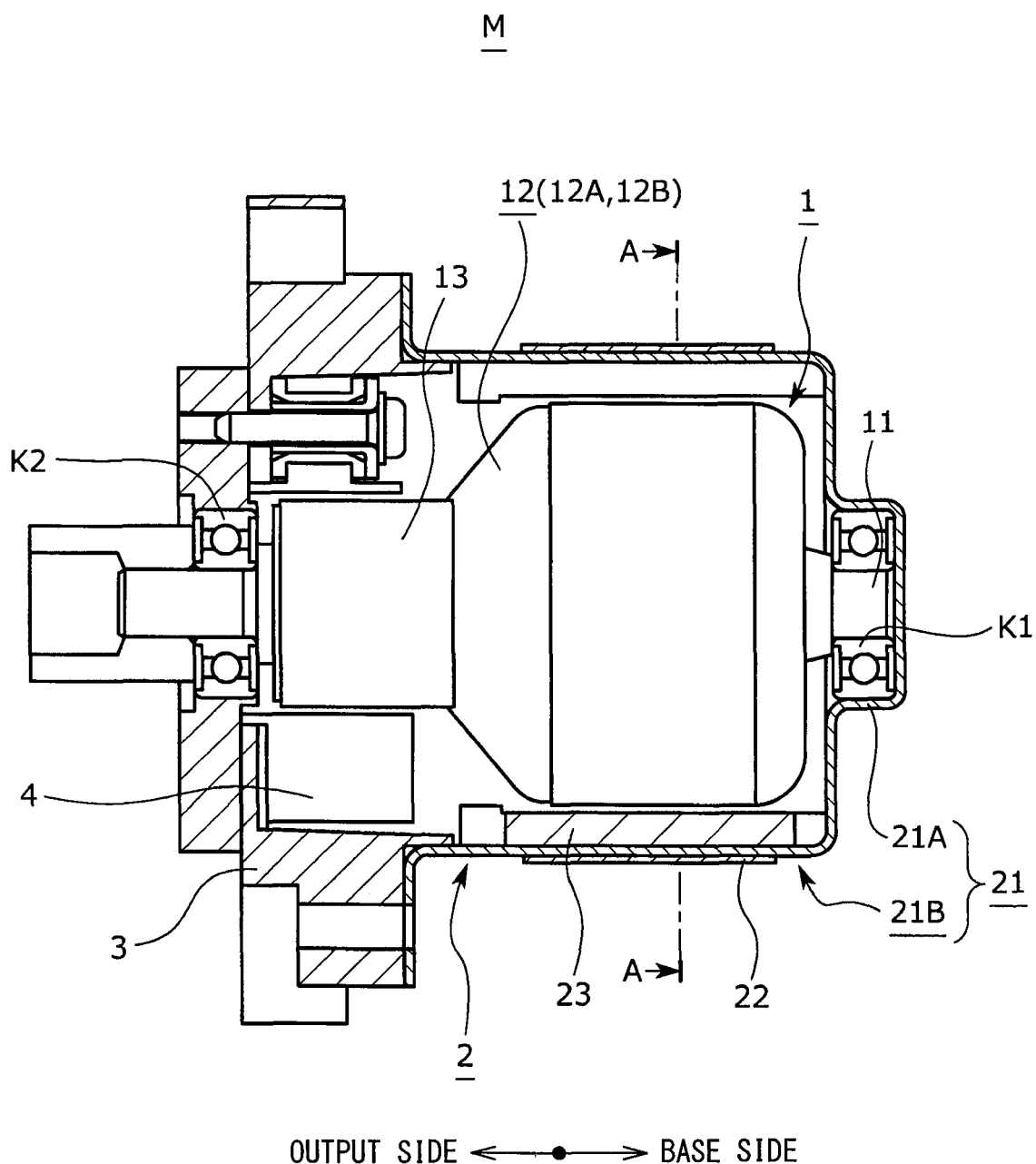
FIG. 1 is a schematic configuration diagram of a motor according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination. Hereinafter, the embodiments of the present disclosure will be described. Configurations in the following descriptions do not limit the present disclosure and can be variously modified within the scope of the present disclosure.

This embodiment describes a stator that can reduce physical impacts on a main yoke when mounting an auxiliary yoke as well as allows easy mounting of the auxiliary yoke, and a manufacturing method thereof.

Figure 2:
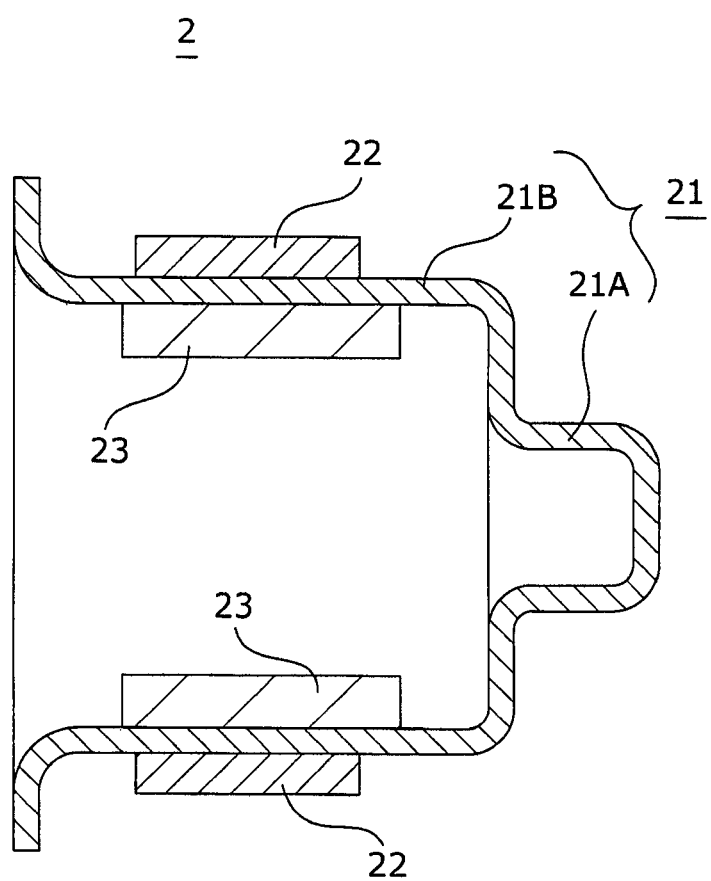
FIG. 2 is a diagram showing a longitudinal cross section of a first stator according to the first embodiment of the present disclosure.
Figure 3:
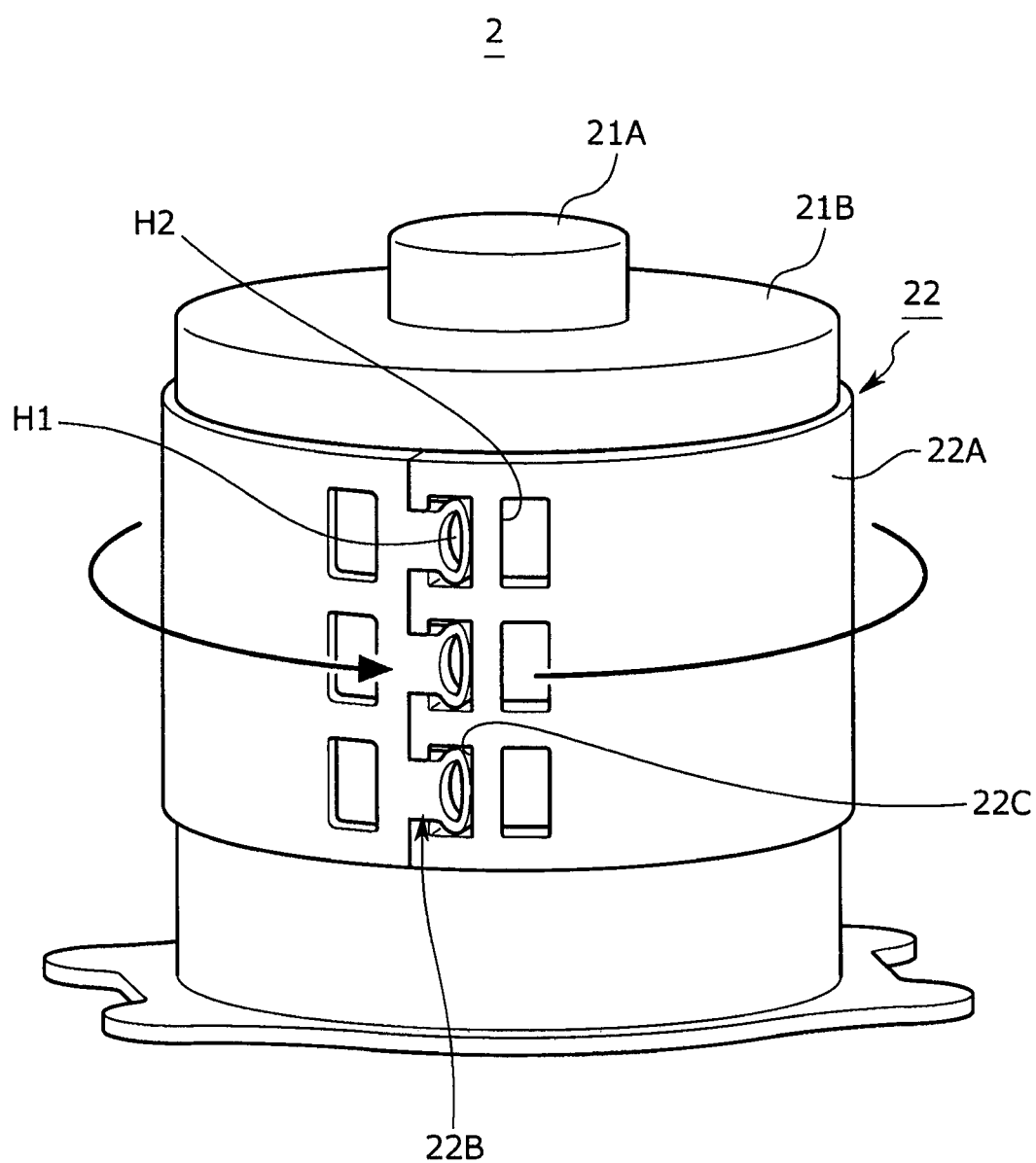
FIG. 3 is a perspective view of the first stator according to the first embodiment of the present disclosure.
Figure 4:
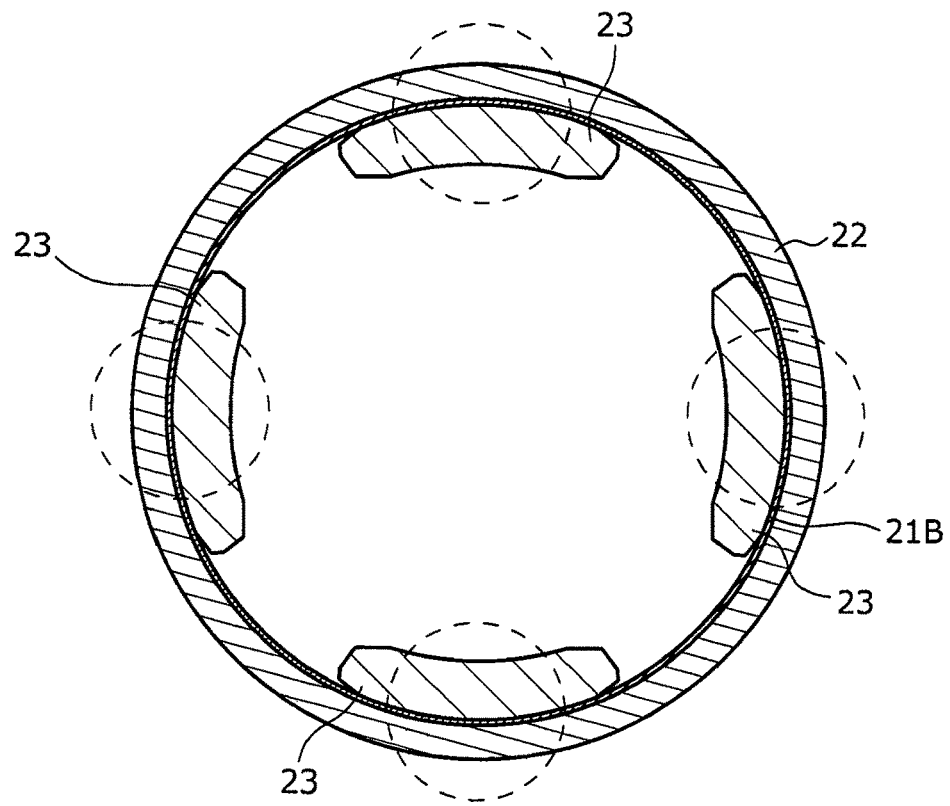
FIG. 4 is a cross-sectional view along line A-A in FIG. 1 and a front view.
Figure 4:
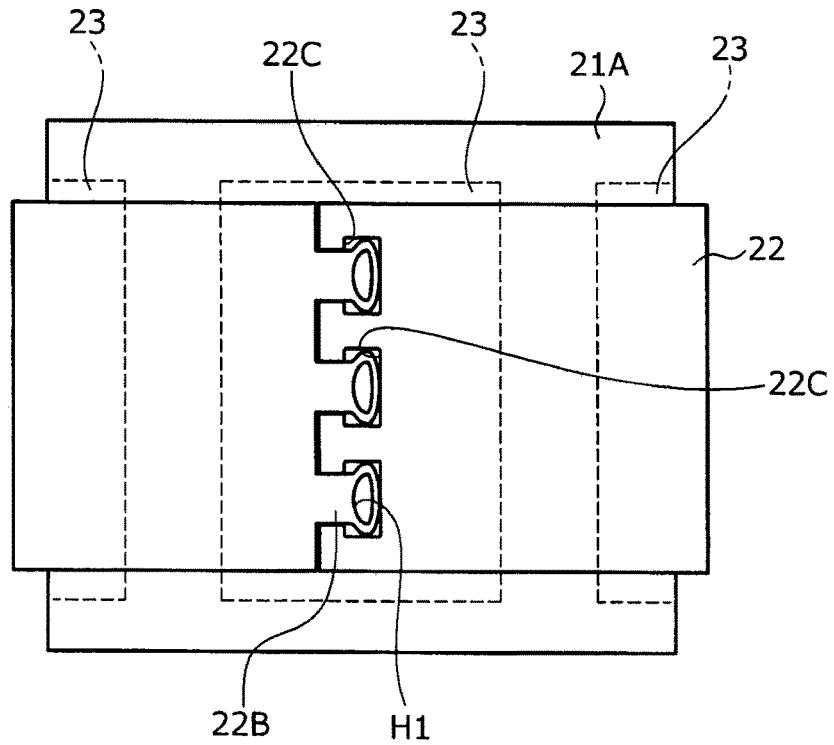
Figure 5:
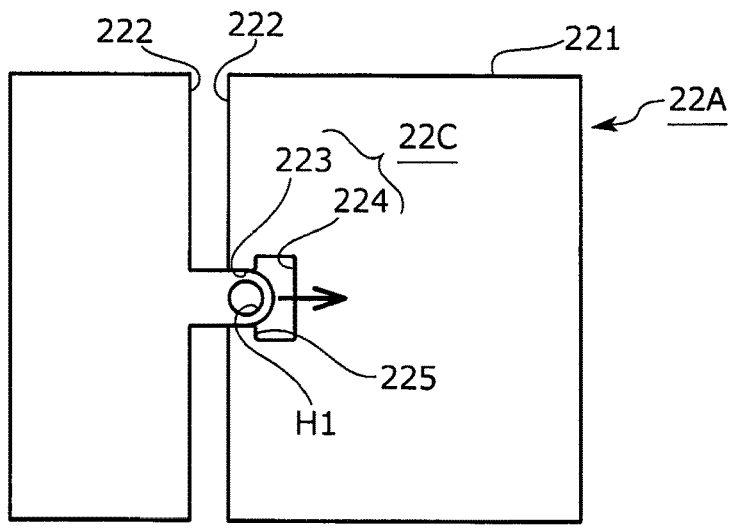
FIG. 5 is illustrative views showing an attachment part of a first auxiliary yoke according to the first embodiment of the present disclosure.
Figure 5:
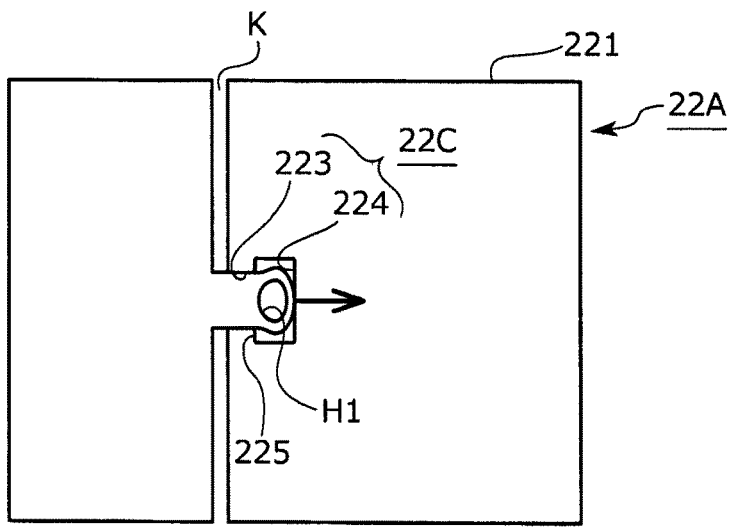
Figure 5:
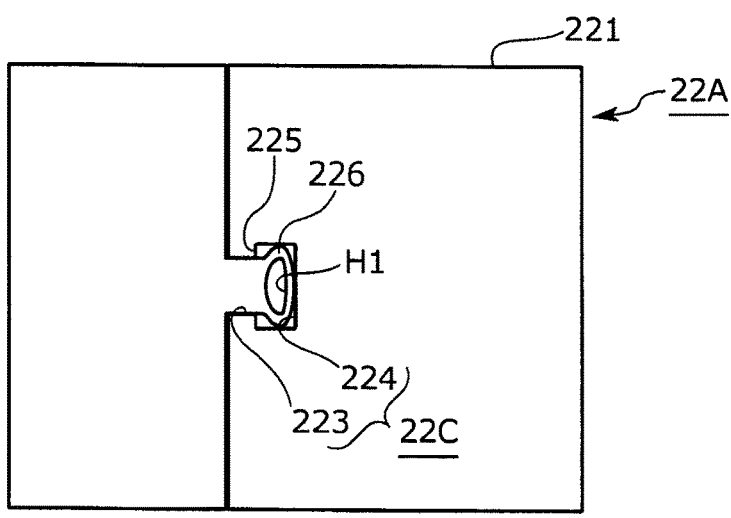
Figure 6:
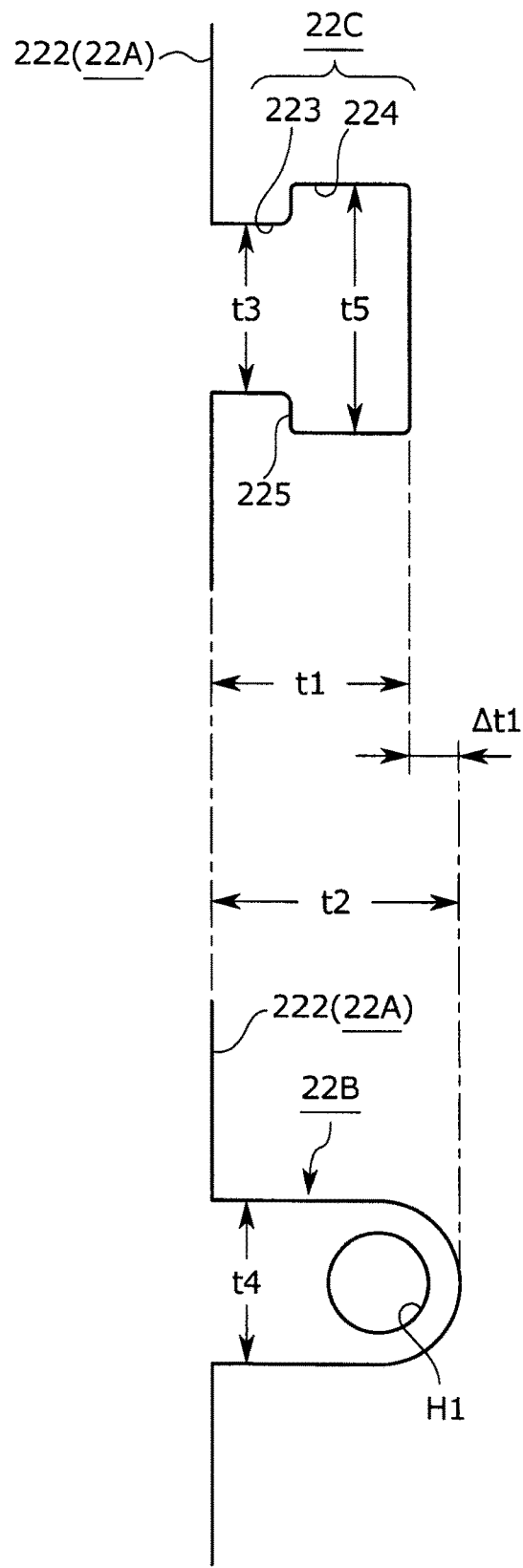
FIG. 6 is an illustrative diagram showing the size configuration of the attachment part of the first auxiliary yoke according to the first embodiment of the present disclosure.
Figure 7:
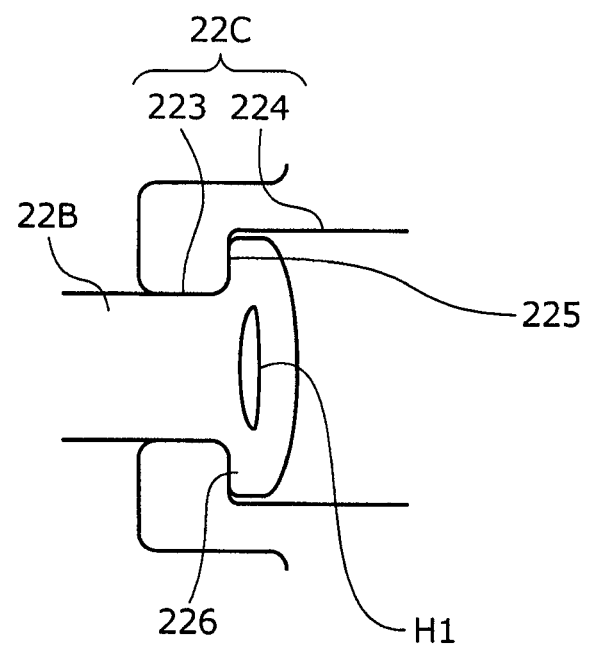
FIG. 7 is a diagram illustrating a variation example of the attachment part of the first auxiliary yoke according to the first embodiment of the present disclosure.
Figure 8:
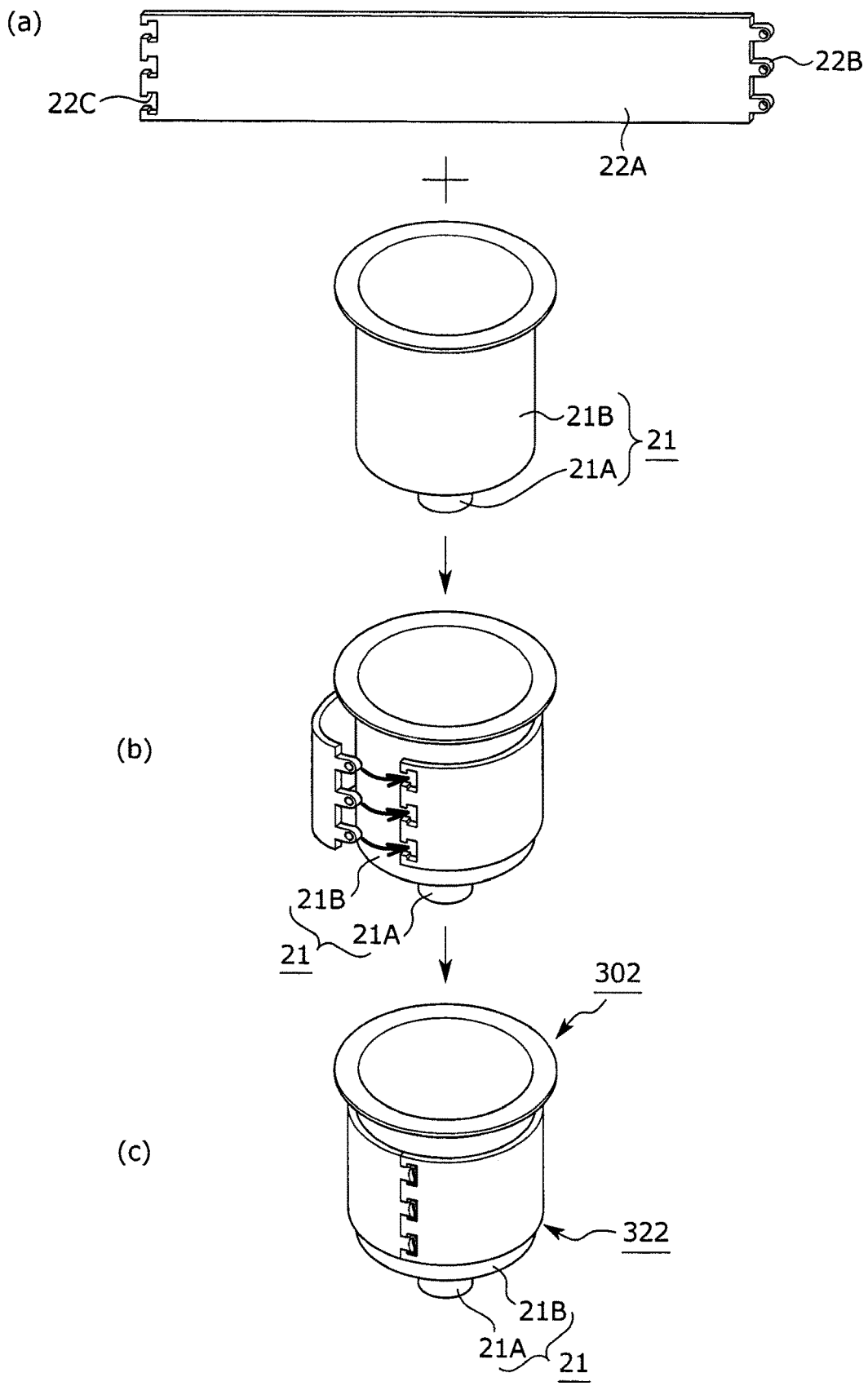
FIG. 8 is illustrative views showing a manufacturing process of the first stator according to the first embodiment of the present disclosure.
Figure 9:
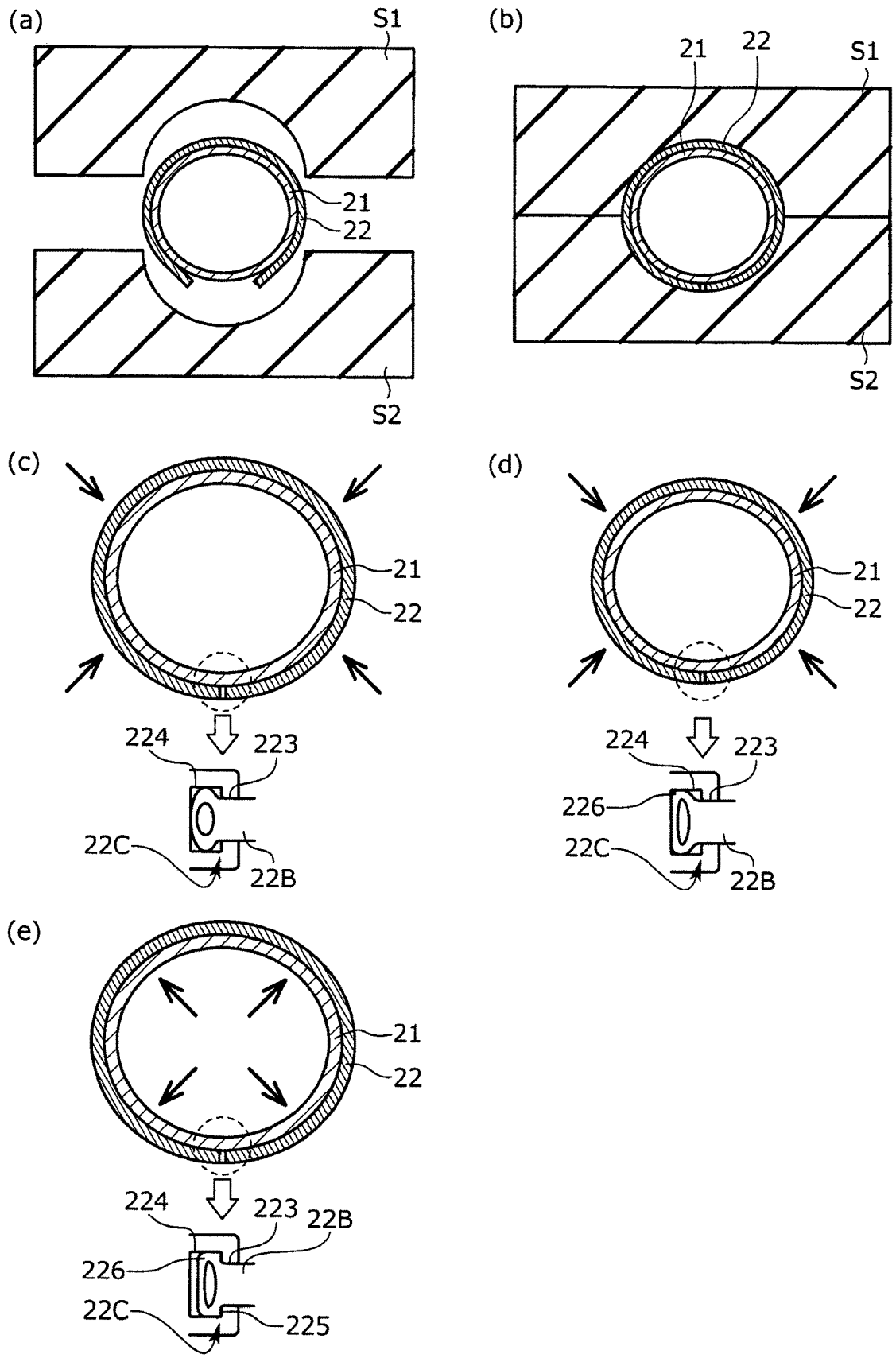
FIG. 9 is diagrams showing a variation example of the manufacturing process of the first stator according to the first embodiment of the present disclosure.
Figure 10:
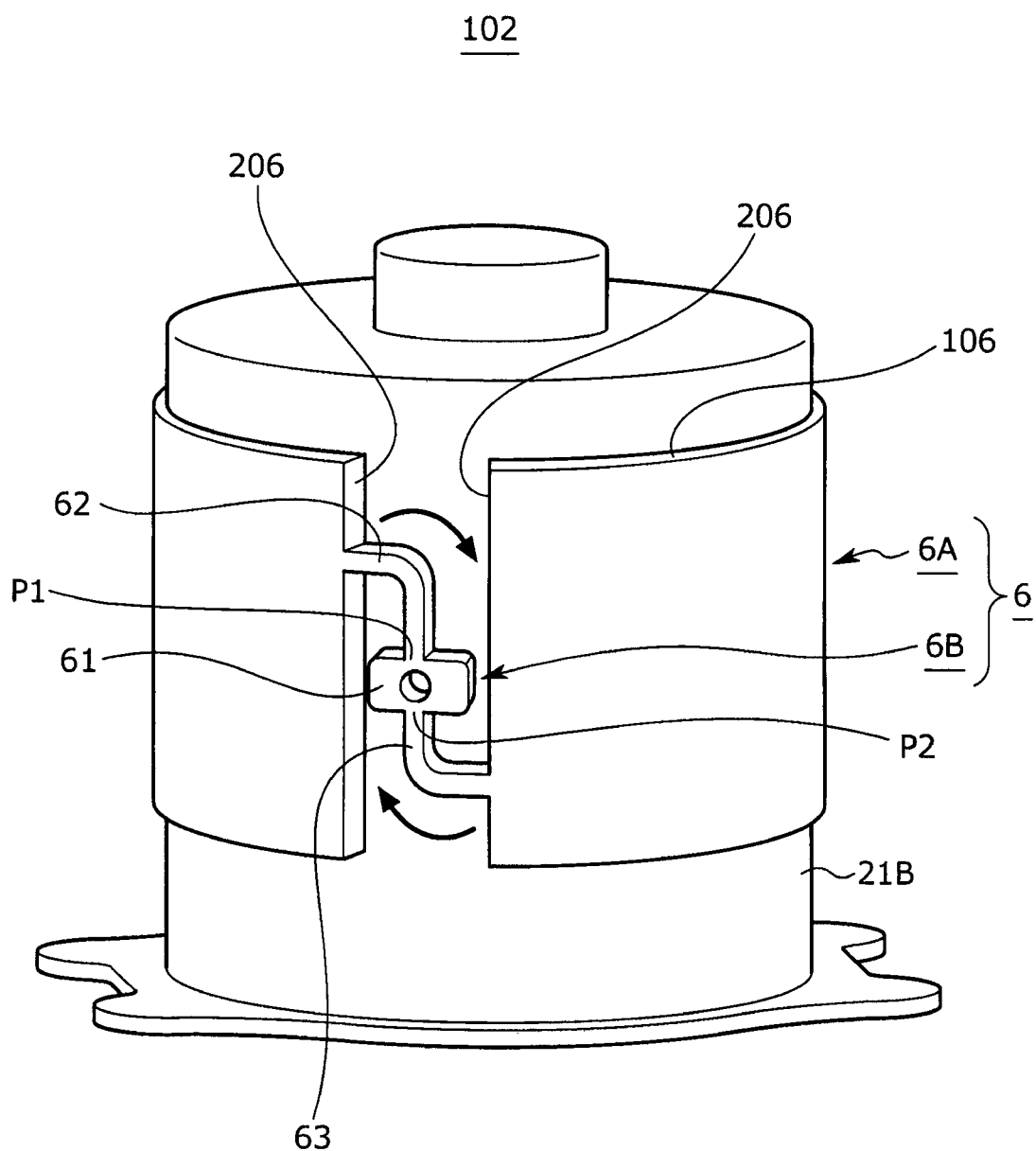
FIG. 10 is a perspective view showing a second stator according to a second embodiment of the present disclosure.
Figure 11:
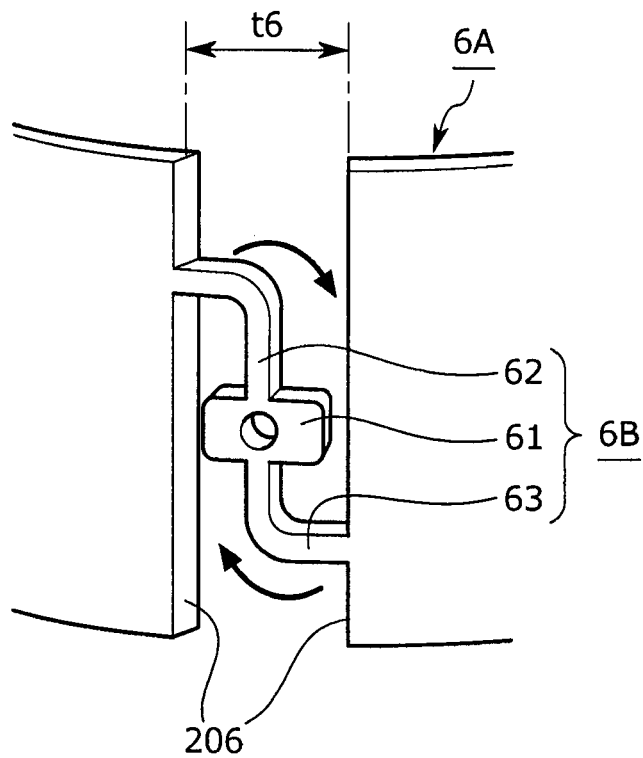
FIG. 11 is illustrative views showing a rotatable fastening part of a second auxiliary yoke according to the second embodiment of the present disclosure.
Figure 11:
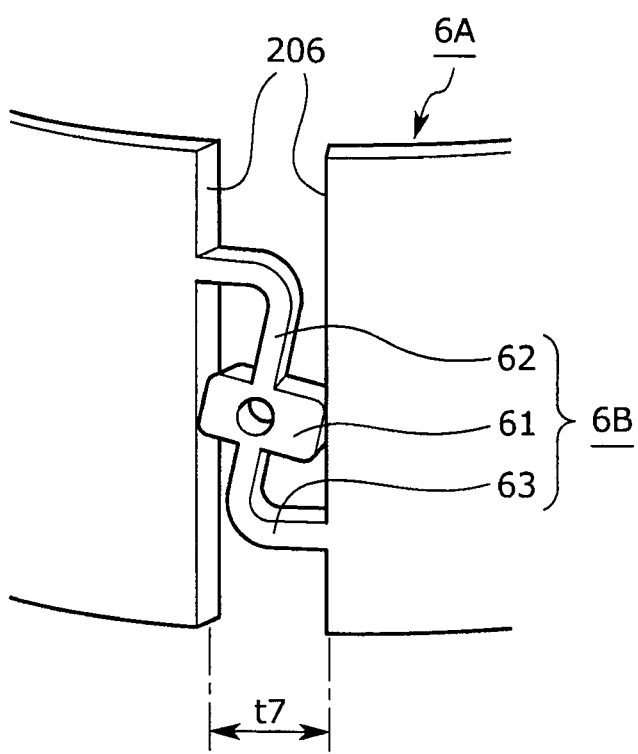
Figure 12:
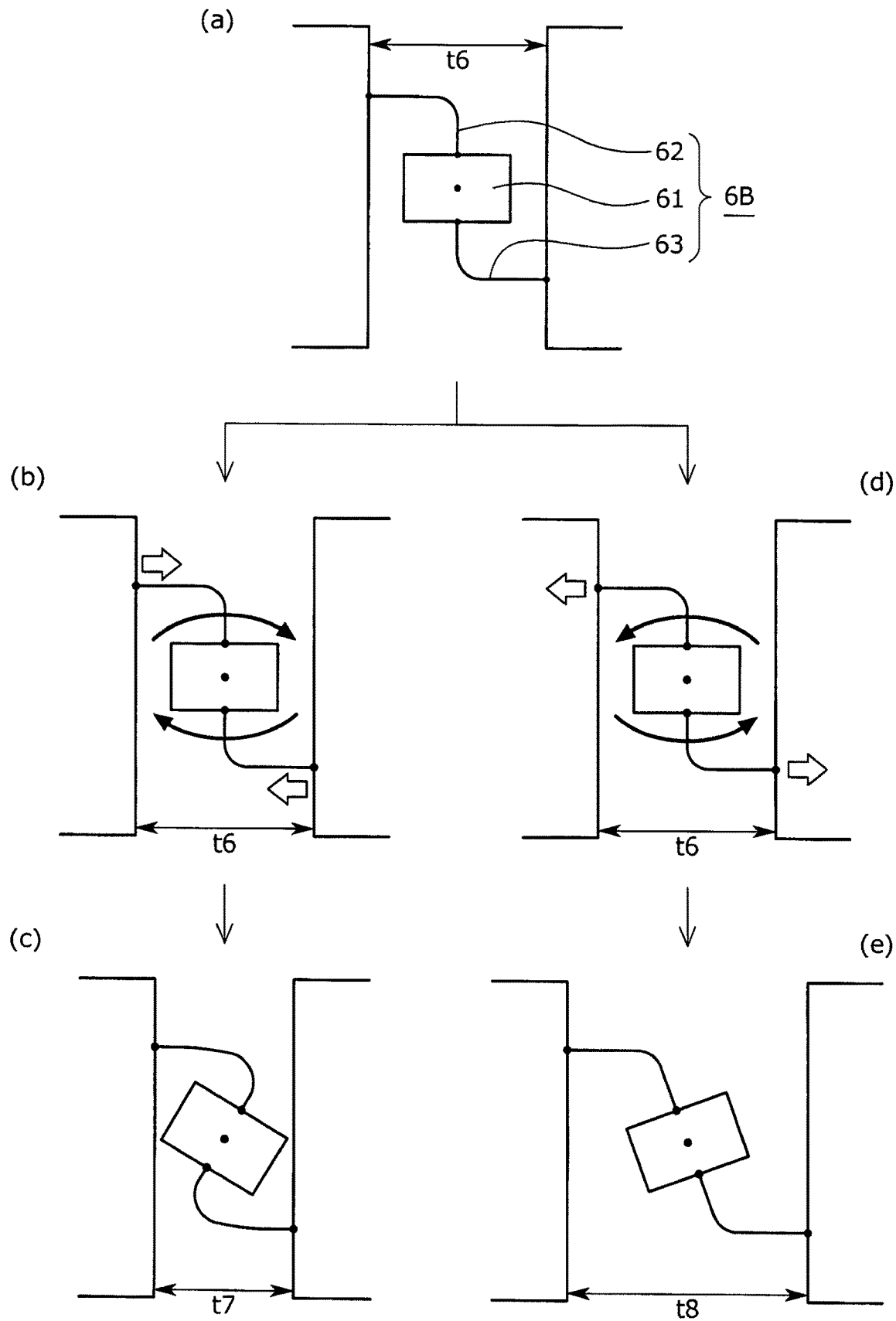
FIG. 12 is illustrative views showing the function of the rotatable fastening part according to the second embodiment of the present disclosure.

FIG. 1 to FIG. 12 illustrate the present disclosure. FIG. 1 shows a schematic configuration diagram of a motor common to a first embodiment and a second embodiment. FIG. 2 to FIG. 7 illustrate the first embodiment. FIG. 2 is a diagram showing a longitudinal cross section of a first stator, FIG. 3 is a perspective view of the first stator, FIG. 4 is a cross-sectional view along line A-A in FIG. 1 and a plan view, FIG. 5 is illustrative views showing an attachment part of a first auxiliary yoke, FIG. 6 is an illustrative diagram showing the size configuration of the attachment part of the first auxiliary yoke, FIG. 7 is a diagram illustrating a variation example of the attachment part of the first auxiliary yoke, FIG. 8 is illustrative views showing a manufacturing process of the first stator, and FIG. 9 is diagrams showing a variation example of the manufacturing process of the first stator. FIG. 2 shows only the stator and magnets, for illustration of the first stator, and does not show other components. FIG. 10 to FIG. 12 illustrate a second embodiment, FIG. 10 is a perspective view showing a second stator, and FIG. 11 is illustrative views showing a rotatable fastening part of a second auxiliary yoke. FIG. 12 shows illustrative views for explaining the function of this rotatable fastening part in detail.

First Embodiment (Schematic Configuration of Motor)

A motor M shown as an example is a DC motor. The configuration of the motor M will be roughly explained below. The motor M according to this embodiment is configured by a combination of a rotor 1, a first stator 2, an end plate 3, and a brush 4. An output side of the motor M refers to the side to which the power of the motor M is transmitted, which is, in FIG. 1, the left side from the viewer's point. A base side refers to the opposite side from the output side in the axial direction of a rotating shaft 11.

As shown in FIG. 1, the rotor 1 is configured to include the rotating shaft 11 that is the center of rotation, an armature 12, and a commutator 13. The armature 12 is assembled to the rotating shaft 11 such as to be integrally rotatable therewith, and configured to have a rotor core 12A, and coils 12B wound around this rotor core 12A. The commutator 13 having a cylindrical shape is secured to the rotating shaft 11. The position where it is secured is on the output side of the armature 12. The commutator is integrally rotatable with the rotating shaft 11. The coils 12B that form the armature 12 are electrically connected to the commutator 13 (more precisely to a commutator piece bonded to the outer periphery thereof).

The first stator 2 is configured to have a main yoke 21 having a cup shape, a first auxiliary yoke 22 having an annular shape and disposed outside the main yoke 21, and field magnets 23. A bearing installation part 21A having a cup shape and protruding toward the base side is formed in the center of a cup-shaped bottom part of the main yoke 21. Parts other than this bearing installation part 21A shall be referred to as "main yoke body part 21B". This bearing installation part 21A houses a ball bearing K1 having an annular shape therein, and this ball bearing K1 rotatably supports a base-side end of the rotating shaft 11. The field magnets 23 are arc-shaped permanent magnets. A plurality of magnets (in a number corresponding to the number of poles) are bonded to the inner wall of the main yoke body part 21B. Since a four-pole configuration is illustrated in this example, there are about four magnets 23.

The main yoke 21 is a magnetic body having a cup shape (cylindrical with a bottom). The main yoke body part 21B, in particular, plays a role in coupling adjacent magnets 23 bonded on the inner wall with magnetic fluxes to configure a magnetic circuit. The first auxiliary yoke 22 is a magnetic body having an annular shape and disposed such as to be wound around the main yoke body part 21B on the outer surface (outer circumferential wall surface) thereof for enhancing the function of the main yoke 21 as part of the magnetic circuit. The structure and others of this first auxiliary yoke 22 for attachment to the main yoke 21 are the main feature of the present disclosure and will be described later in detail.

The open side of the main yoke 21 is closed by the end plate 3 (brush holder). A through hole (not shown) is formed in a central part of this end plate 3 for allowing the output side of the rotating shaft 11 to extend through. A ball bearing K2 having an annular shape is disposed on an inner wall surface of this through hole. This ball bearing K2 axially supports the output side of the rotating shaft 11 in a rotatable manner. Further, the brush 4 is disposed on a surface of the end plate 3 facing the base side. This brush 4 is a square columnar member and configured such that its end portion on the radially center side makes contact with an outer surface of the commutator 13 (more precisely, a commutator piece bonded to the outer periphery thereof).

As described above, the armature 12 that forms the rotor 1 is housed inside the first stator 2 having a cup shape, and the opening of the first stator 2 (open on the output side) is closed by the end plate 3, with the output-side end of the rotating shaft 11 protruding. The base-side end and the output-side end of the rotating shaft 11 in this state are axially supported by the ball bearings K1 and K2 in a rotatable manner, and the brush 4 disposed on the output side of the end plate 3 makes contact with the outer surface of the commutator 13. The field magnets 23 are bonded to the inner surface of the main yoke body part 21B that forms the first stator 2, and these magnets 23 are configured to face the outer surface of the armature 12.

Although not shown, the brush 4 is configured such that current is supplied from an external power supply. The current supplied from this brush 4 is commutated by the commutator 13 and supplied to the armature 12. The armature 12 that has become an electromagnet with switching magnetization directions and the fixed field magnets 23 interact with each other, which causes the rotor 1 to rotate. This first stator 2 has one yoke built by a combination of the main yoke 21 and the first auxiliary yoke 22, which, in this example, is configured such that the first auxiliary yoke 22 in an annular shape is arranged on the outer surface of the main yoke 21. While this embodiment describes the configuration in which the first auxiliary yoke 22 is arranged on the outer surface of the main yoke 21, it goes without saying that the yoke configuration is not limited to this. In an alternative configuration, the first auxiliary yoke 22 in an annular shape may be arranged on an inner surface (inner circumferential wall surface) of the main yoke 21, with the magnets 23 disposed on the inner surface of this first auxiliary yoke 22. In view of work efficiency during the manufacturing, however, the configuration with the first auxiliary yoke 22 being disposed on the outer surface of the main yoke 21 is more preferable.

<Configuration of First Auxiliary Yoke>

The structure of the first auxiliary yoke 22 according to this embodiment will be described with reference to FIG. 3 to FIG. 7. The first auxiliary yoke 22 according to this embodiment is a cylindrical component formed by rolling a rectangular band-shaped plate-like member into a circular shape. The first auxiliary yoke 22 according to this embodiment is configured to have a first auxiliary yoke body part 22A, first auxiliary yoke protrusions 22B, and first auxiliary yoke recesses 22C, as shown in FIG. 3. The first auxiliary yoke body part 22A is a rectangular (band-shaped) plate member, which is the part that will become cylindrical when it is rolled into a circular shape. For the sake of explanation, the long side of the first auxiliary yoke body part 22A in a rectangular shape shall be hereinafter referred to as "long side 221", and the short side as "short side 222". The long side 221 is formed to have substantially the same length as the length of the circumference of the outer surface of the main yoke body part 21B.

The first auxiliary yoke protrusions 22B are formed on one short side 222 of the first auxiliary yoke body part 22A (i.e., one end of the first auxiliary yoke 22). The first auxiliary yoke recesses 22C are formed on the other short side 222 of the first auxiliary yoke body part 22A (i.e., the other end of the first auxiliary yoke 22). The first auxiliary yoke protrusion 22B is a projection protruding from one short side 222 in a direction along which the long side 221 extends. In this embodiment, a distal end portion of the first auxiliary yoke protrusion 22B is initially formed in a circular arc shape. In the first auxiliary yoke protrusion 22B, an absorption hole H1 is formed (more precisely, hollowed out), as shown in FIG. 5. As will be described later, this absorption hole H1 is a portion that serves as a relief hole when the first auxiliary yoke protrusion 22B is deformed inside the first auxiliary yoke recess 22C. In this embodiment, there are three first auxiliary yoke protrusions 22B side by side along the axial direction as shown in FIG. 3.

The first auxiliary yoke recess 22C is a portion recessed from the other short side 222 along the direction in which the long side 221 extends. In this embodiment, the first auxiliary yoke recess 22C is formed to have an insertion part 223 and a deformation part 224, as shown in FIG. 5. The insertion part 223 corresponds to a first hole closer to the opening of the first auxiliary yoke recess 22C, and is a hole in a quadrate shape cut from the other short side 222. The deformation part 224 is a second hole farther from the opening of the first auxiliary yoke recess 22C than the insertion part 223, a quadrate opening continuous with the insertion part 223. The axial size of the insertion part 223 (opening width) is set substantially equal to the axial size (length in the axial direction) of a base part of the first auxiliary yoke protrusion 22B and smaller than the axial size of the deformation part 224. Namely, the first auxiliary yoke recess 22C is a slit-like hole opened along a direction in which the long side 221 extends (opened from one short side 222 toward the other short side 222), with its entrance side (on the end side of one short 222) being a narrower hole (insertion part 223) and the deeper side being a wider hole (deformation part 224). More specifically, as shown in FIG. 5, there is formed a step 225 in the shape of letter L between the insertion part 223 and the deformation part 224. In this embodiment, as shown in FIG. 3, three first auxiliary yoke recesses 22C are formed side by side in the axial direction. The positions of the three first auxiliary yoke protrusions 22B are determined such that, when the first auxiliary yoke body part 22A is rolled into a circular shape so that both short sides 222, 222 meet, the three first auxiliary yoke protrusions 22B are aligned with the positions of the three first auxiliary yoke recesses 22C.

In this embodiment, as shown in FIG. 3, buffer holes H2 are formed near the base side of the first auxiliary yoke protrusions 22B and near the deformation parts 224 of the first auxiliary yoke recesses 22C. These buffer holes H2 are portions that provide buffer for preventing a force applied by an engagement operation in which the first auxiliary yoke protrusion 22B is engaged with the first auxiliary yoke recess 22C, and deformation caused by this force, from propagating to other parts of the first auxiliary yoke body part 22A (parts other than the ends where the engagement takes place). Namely, when the first auxiliary yoke body part 22A is rolled into a circular shape so that both short sides 222, 222 meet, the distal ends of the first auxiliary yoke protrusions 22B fit into the first auxiliary yoke recesses 22C, causing the absorption holes H1 to deform. With both short sides 222, 222 making tight contact with each other, when the distal ends of the first auxiliary yoke protrusions 22B are pushed deeper into the first auxiliary yoke recesses 22C, the buffer holes H2 deform to exhibit their function.

In this embodiment, as shown in FIG. 4, the joint of the first auxiliary yoke 22, i.e., where one short side 222 is caused to abut on the other short side 222, is arranged outside the position where the magnet 23 is arranged. Preferably, this abutting part is positioned within a circumferential range where the magnet 23 is arranged, as shown in FIG. 4(b). Even more preferably, the position where the first auxiliary yoke protrusion 22B engages with the first auxiliary yoke recess 22C is radially aligned with the center of gravity of the magnet 23. Since three first auxiliary yoke protrusions 22B engage with three first auxiliary yoke recesses 22C in this embodiment, the position where the first auxiliary yoke protrusion 22B and the first auxiliary yoke recess 22C located at the center in the axial direction engage with each other is arranged to be radially aligned with the position which is the center of gravity of the magnet 23. When there is one position where the first auxiliary yoke protrusion 22B engages with the first auxiliary yoke recess 22C, this single engagement position should preferably be radially aligned with the position which is the center of gravity of the magnet 23. The point in question of the magnet 23 is a portion that is not used as a magnetic path and is not affected by a magnetic loss. Therefore, this position in question is made to be one of the engagement positions between the first auxiliary yoke protrusions 22B and the first auxiliary yoke recesses 22C.

Next, the engagement between the first auxiliary yoke protrusion 22B and the first auxiliary yoke recess 22C will be described with reference to FIG. 5 to FIG. 7. As shown in FIG. 5(a), the first auxiliary yoke protrusion 22B is inserted into the first auxiliary yoke recess 22C. As shown in FIG. 6, the first auxiliary yoke protrusion 22B is configured to have a length t2 (distance in the direction in which the long side 221 extends) slightly larger than the length t1 of the first auxiliary yoke recess 22C in the same direction. Therefore, when the distal end portion of the first auxiliary yoke protrusion 22B abuts on the bottom side of the first auxiliary yoke recess 22C, a small gap K is formed between one short side 222 and the other short side 222 as shown in FIG. 5(b). This gap K has a width Δt that equals to Δt2−Δt1. As shown in FIG. 6, the insertion part 223 is formed to have an axial size t3 that is substantially equal to the axial size t4 of the first auxiliary yoke protrusion 22B (length t3≈length t4). Because of this configuration, in the state shown in FIG. 5(b), the base side of the first auxiliary yoke protrusion 22B is retained in the insertion part 223. In this embodiment, in order to engage the first auxiliary yoke protrusion 22B more firmly with the first auxiliary yoke recess 22C, a force is further applied in the direction of the arrow from the state shown in FIG. 5(b). Needless to say, from the viewpoint of facilitating insertion of the first auxiliary yoke protrusion 22B into the insertion part 223, the axial size t3 of the insertion part 223 may be made slightly larger than the axial size t4 of the first auxiliary yoke protrusion 22B.

In this way, as a force is applied in the direction of the arrow in the state shown in FIG. 5(b), the width of the gap K becomes almost 0, so that one short side 222 and the other short side 222 make contact (including pressure contact) with or come closer to each other. Simultaneously, the distal end of the first auxiliary yoke protrusion 22B makes pressure contact with the first auxiliary yoke recess 22C, so that, as shown in FIG. 5(c), the distal end portion of the first auxiliary yoke protrusion 22B undergoes deformation inside the deformation part 224 of the first auxiliary yoke recess 22C. Since the deformation part 224 is formed to have an axial size t5 that is larger than the axial size t4 of the first auxiliary yoke protrusion 22B, this difference in distance provides allowance for deformation, so that the distal end of the first auxiliary yoke protrusion 22B undergoes deformation inside the first auxiliary yoke recess 22C. In other words, the distal end of the first auxiliary yoke protrusion 22B is compressed. The absorption hole H1 formed in the distal end portion of the first auxiliary yoke protrusion 22B deforms at this time, thereby effectively preventing the first auxiliary yoke protrusion 22B from breaking caused by the applied force.

As described above, in this embodiment, the distal end portion of the first auxiliary yoke protrusion 22B is compressed inside the deformation part 224 such as to spread in the axial direction, as a result of which the axial size of the distal end portion of the first auxiliary yoke protrusion 22B becomes larger than the axial size t3 of the insertion part 223. In other words, a spread part 226 is formed at the distal end of the first auxiliary yoke protrusion 22B as a result of this distal end portion being compressed to spread so that its axial size is prolonged. Both axial ends of this spread part 226 make pressure contact with the edge surfaces of the deformation part 224 positioned at both axial ends as shown in FIG. 5(c), and thus the first auxiliary yoke protrusion 22B engages with the first auxiliary yoke recess 22C. This enables a reliable and firm engagement between the first auxiliary yoke protrusion 22B and the first auxiliary yoke recess 22C. With the distal end of the first auxiliary yoke protrusion 22B making pressure contact with the inside of the deformation part 224 as described above, the first auxiliary yoke protrusion 22B is effectively prevented from coming out of the insertion part 223.

As has been described above, according to the first embodiment of the present disclosure, with the first auxiliary yoke 22 being arranged on the outer surface of the main yoke 21 along the circumferential direction thereof, the first auxiliary yoke protrusions 22B face and engage with the first auxiliary yoke recesses 22C. Thus, the first auxiliary yoke 22 can be wound around the outer surface of the main yoke 21 without affecting (more specifically, without causing deformation in the inner diameter of) the main yoke 21. The accuracy requirements for the inner and outer diameters of the main yoke 21 and the first auxiliary yoke 22 can be made less stringent, and problems such as peeling of coating or machine oil accumulation on the outer surface of the main yoke 21 can be made less likely to occur. The engagement structure described above applies similarly to a configuration wherein the first auxiliary yoke 22 is arranged along the inner surface of the main yoke 21. In such a configuration, the first auxiliary yoke protrusion 22B is engaged with the first auxiliary yoke recess 22C on the radially center side relative to the inner surface of the main yoke 21.

When both axial ends of the spread part 226 formed at the distal end of the first auxiliary yoke protrusion 22B make pressure contact with the edge surfaces positioned at both axial ends of the deformation part 224 as shown in FIG. 5(c), the engagement is maintained only by friction generated therebetween. If, as shown in FIG. 7, the first auxiliary yoke protrusion 22B engages with the first auxiliary yoke recess 22C such that the surface of the spread part 226 positioned at the base side of the first auxiliary yoke protrusion 22B makes tight contact with (tightly abutting on) the step 225 in the first auxiliary yoke recess 22C, the engagement will be maintained even more firmly.

<Manufacturing Method of First Stator>

Next, a manufacturing method of the first stator 2 according to this embodiment will be described with reference to FIG. 8. As has been described above and shown in FIG. 8(a), the first auxiliary yoke 22 is initially formed as a rectangular band-shaped plate member. Three first auxiliary yoke protrusions 22B are formed on one short side, while three first auxiliary yoke recesses 22C are formed on the other short side. In a placement step shown in FIG. 8(b), the first auxiliary yoke body part 22A of this first auxiliary yoke 22 having a band shape is wound around the outer surface of the main yoke body part 21B. The winding is carried out such that the first auxiliary yoke protrusions 22B and the first auxiliary yoke recesses 22C abut on each other in the circumferential direction. Then, in an insertion step, as shown by the arrow in FIG. 8(b), the first auxiliary yoke protrusions 22B are inserted into the first auxiliary yoke recesses 22C (see also FIG. 5A). Next, in a pressing step shown in FIG. 8(c), a force F is further applied in the circumferential direction to press the distal ends of the first auxiliary yoke protrusions 22B to the inner edges of the deformation parts 224 of the first auxiliary yoke recesses 22C to deform the distal ends of the first auxiliary yoke protrusions 22B. Finally, distal end portions of the first auxiliary yoke protrusions 22B undergo deformation (in other words, form spread parts 226) inside the deformation parts 224 of the first auxiliary yoke recesses 22C to make pressure contact with the edge surfaces at both axial ends of the deformation parts 224. This causes the first auxiliary yoke protrusions 22B to engage with the first auxiliary yoke recesses 22C reliably and firmly (see also FIG. 5(b) and FIG. 5(c)). The first auxiliary yoke 22 is thus attached to the main yoke 21. If the surfaces of the spread parts 226 positioned on the base side of the first auxiliary yoke protrusions 22B are in tight contact with (tightly abutting on) the steps 225 between the insertion parts 223 and the deformation parts 224, the engaging state of the first auxiliary yoke protrusions 22B and the first auxiliary yoke recesses 22C can be maintained even more firmly.

In forming the first stator 2, a step of placing the magnets 23 is also performed, which may be carried out at any stage. Preferably, the magnets should be placed prior to the winding of the first auxiliary yoke 22 around the main yoke body part 21B in order that the position where the first auxiliary yoke protrusions 22B and the first auxiliary yoke recesses 22C are to engage with each other can be more readily determined. Since the first auxiliary yoke 22 is wound around the outer surface of the main yoke body part 21B in this embodiment, the magnets 23 are disposed on the inner surface of the main yoke body part 21B by any method such as adhesion using an adhesive, welding, and the like.

<Variation Example of the Manufacturing Method of First Stator>

Next, a variation example of the manufacturing method of the first stator 2 according to this embodiment will be described with reference to FIG. 9. Although the steps shown in FIG. 9(c) to FIG. 9(e) are carried out using two split molds S1 and S2 to be described later, the split molds S1 and S2 are omitted in FIG. 9(c) to FIG. 9(e) for convenience of explanation. FIG. 9(c) to FIG. 9(e) also show an enlarged view of the attachment portion of the first auxiliary yoke 22. According to the variation example of the manufacturing method of the first stator 2, the main yoke 21 and the first auxiliary yoke 22 are sandwiched between forming molds (split molds S1 and S2) split into two, upper and lower, parts as shown in FIG. 9(a), and both yokes are radially compressed to set the first auxiliary yoke 22 on the outer surface of the main yoke 21. More specifically, in the placement step, the first auxiliary yoke body part 22A of the first auxiliary yoke 22 having a band shape is wound around the outer surface of the main yoke body part 21B. After that, the main yoke 21 with the first auxiliary yoke 22 wound therearound is encased inside an enclosure space of substantially a columnar shape formed between the two split molds S1 and S2 as shown in FIG. 9(b). With the main yoke 21 and the first auxiliary yoke 22 being encased inside the enclosure space, both yokes sandwiched between the two split molds S1 and S2 are radially compressed, to carry out the insertion step and pressing step. As a result, the distal end of the first auxiliary yoke protrusion 22B is inserted through the insertion part 223 into the first auxiliary yoke recess 22C, makes pressure contact with the deformation part 224 and deforms, whereby the spread part 226 is formed, as shown in FIG. 9(c). After that, when the main yoke 21 and the first auxiliary yoke 22 are further compressed radially, both yokes reduce in diameter as shown in FIG. 9(d), and the distal end of the first auxiliary yoke protrusion 22B is further compressed so that the spread part 226 expands to a length corresponding to the axial size of the deformation part 224. After the steps described above, while the main yoke 21 tries to restore to its original diameter, the first auxiliary yoke 22 tries to keep its compressed state against the pressure from the main yoke 21. Thus, the first auxiliary yoke protrusion 22B is subjected to a force that causes it to be released from the first auxiliary yoke recess 22C. The spread part 226, however, is hooked on the step 225 between the insertion part 223 and the deformation part 224 as shown in FIG. 9(e). Thus, the engaging state between the first auxiliary yoke protrusion 22B and the first auxiliary yoke recess 22C is maintained firmly.

Second Embodiment

Next, a second embodiment will be described with reference to FIG. 10 to FIG. 12. The second stator 102 according to this embodiment, as compared to the first embodiment described above, has a second auxiliary yoke 6 having a different shape from that of the first auxiliary yoke 22, and is similar in other features. The second auxiliary yoke 6 includes a second auxiliary yoke body part 6A and a rotatable fastening part 6B as shown in FIG. 10. The second auxiliary yoke body part 6A is a rectangular (band-shaped) plate member, which is the part that will become cylindrical when it is rolled into a circular shape. For the sake of explanation, the long side of the second auxiliary yoke body part 6A in a rectangular shape shall be hereinafter referred to as "long side 106", and the short side as "short side 206". This long side 106 is formed slightly shorter than the length of the circumference of the outer surface of the main yoke body part 21B.

The rotatable fastening part 6B is formed to have an action part 61, one connecting part 62, and the other connecting part 63, as shown in FIG. 10. The action part 61 is formed in a quadrate plate-like shape. One connecting part 62 extends from one point P1 at one point in the circumference thereof toward one short side 206, while the other connecting part 63 extends from another point P2 at another point in the circumference thereof toward the other short side 206. The one point P1 and the other point P2 are set at point symmetrical positions about the center of the action part 61. Because of this configuration, applying a torque in the direction of black arrows to the action part 61 causes the circumferential distance between the short sides 206, 206 of the second auxiliary yoke body part 6A to reduce.

Namely, as shown in FIG. 11, applying a torque in the direction of black arrows to the action part 61 causes the circumferential distance between the short sides 206, 206 of the second auxiliary yoke body part 6A to reduce from t6 to t7. Thus, the second auxiliary yoke 6 can be attached to the outer circumference of the main yoke body part 21B by inserting the main yoke body part 21B into the second auxiliary yoke 6 in an initial state where the second auxiliary yoke 6 is formed to have a larger inner circumference than the outer circumference of the main yoke body part 21B by (t6−t7), and by applying a torque in the direction of black arrows to the action part 61. FIG. 12 schematically shows the function of the rotatable fastening part 6B. By a series of actions as shown in FIGS. 12(a), 12(b), and 12(c), the circumferential distance between the short sides 206, 206 of the second auxiliary yoke body part 6A is reduced from t6 to t7 as described above. By applying a torque in the opposite direction to the action part 61, the circumferential distance between the short sides 206, 206 of the second auxiliary yoke body part 6A can be widened from t6 to t8. Thus, in this embodiment, the second auxiliary yoke 6 is detachable, and fine adjustments can also be easily made.

When this second auxiliary yoke 6 is to be mounted to the inner circumferential surface of the main yoke body part 21B, the circumferential distance between the short sides 206, 206 of the second auxiliary yoke body part 6A can be widened from t6 to t8. This is achieved by a series of actions as shown in FIGS. 12(a), 12(d), and 12(e). That is, the second auxiliary yoke 6 can be attached to the inner circumference of the main yoke body part 21B by inserting the second auxiliary yoke 6 into the main yoke body part 21B in an initial state where the second auxiliary yoke 6 is formed to have a smaller inner circumference than the inner circumference of the main yoke body part 21B by (t8−t6), and by applying a torque in the direction of black arrows in FIG. 12(d) to the action part 61.

The rotatable fastening part 6B should also preferably be arranged on the outer side of a position where the magnet 23 is arranged for similar reasons as the first embodiment. The following is the manufacturing method of the second stator 102. First, a placement step is performed, in which the main yoke body part 21B is inserted into the second auxiliary yoke 6 in an initial state (where it is cylindrical, with the short sides 206, 206 being coupled together via the rotatable fastening part 6B) (alternatively, the second auxiliary yoke 6 is inserted into the main yoke body part 21B). Next, a pressing step is performed, in which the action part 61 is rotated to reduce the circumferential distance between the short sides 206, 206 of the second auxiliary yoke body part 6A (or spread them apart) to cause the second auxiliary yoke 6 to make pressure contact with the outer circumferential wall surface (or inner circumferential wall surface) of the main yoke body part 21B. Other steps such as setting magnets 23 in making the second stator 102 are similar to those of the first embodiment and will not be described again.

<Manufacturing Method of Split Core Stator>

Figure 13:
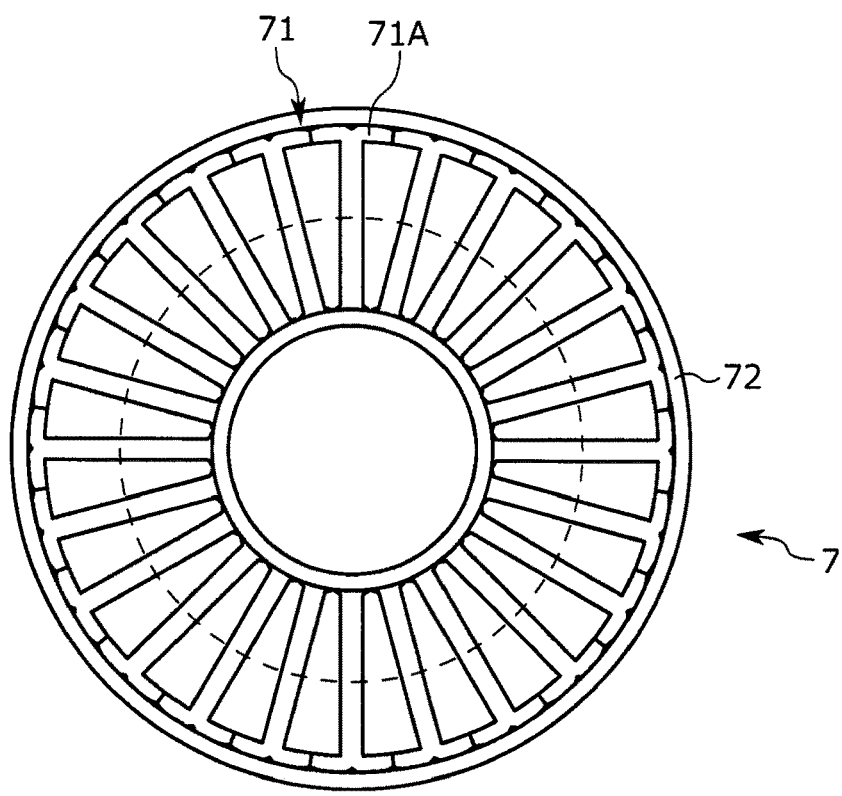
FIG. 13 is a schematic plan view of a split core stator.
Figure 14:
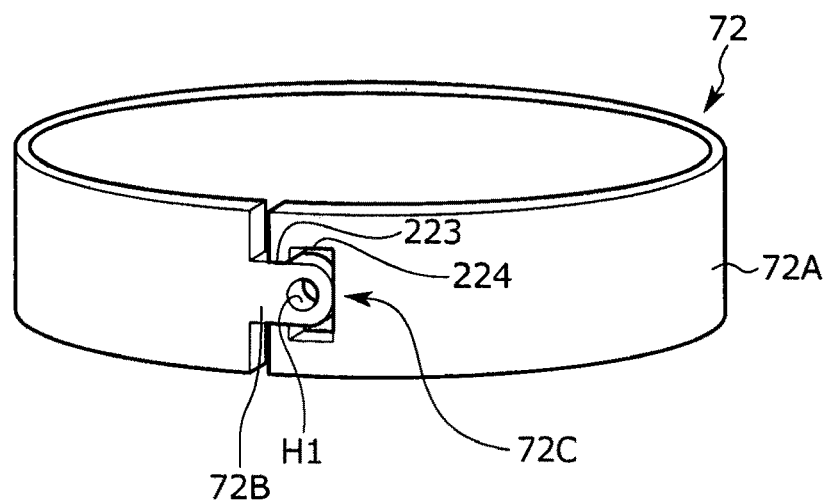
FIG. 14 is a perspective view of a wound yoke.
Figure 15:
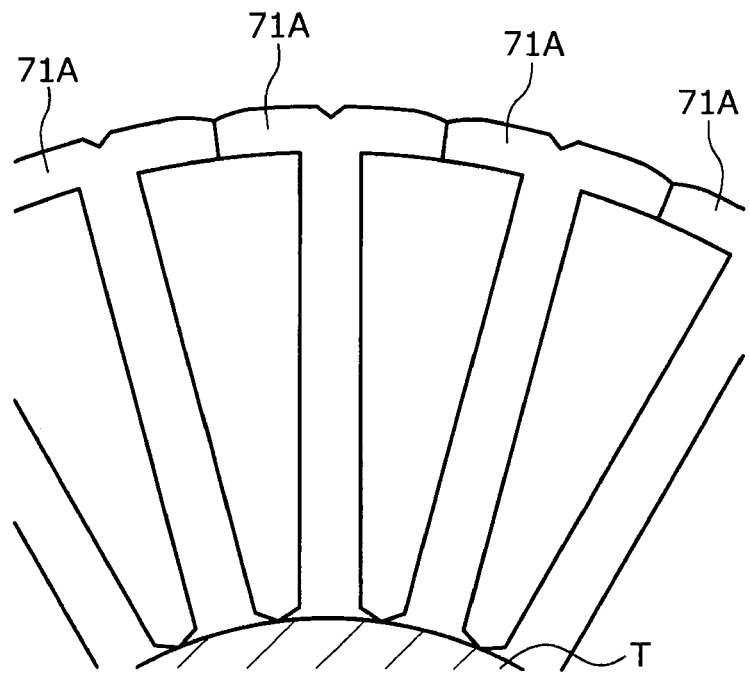
FIG. 15 is illustrative views showing a manufacturing process of the split core stator.
Figure 15:
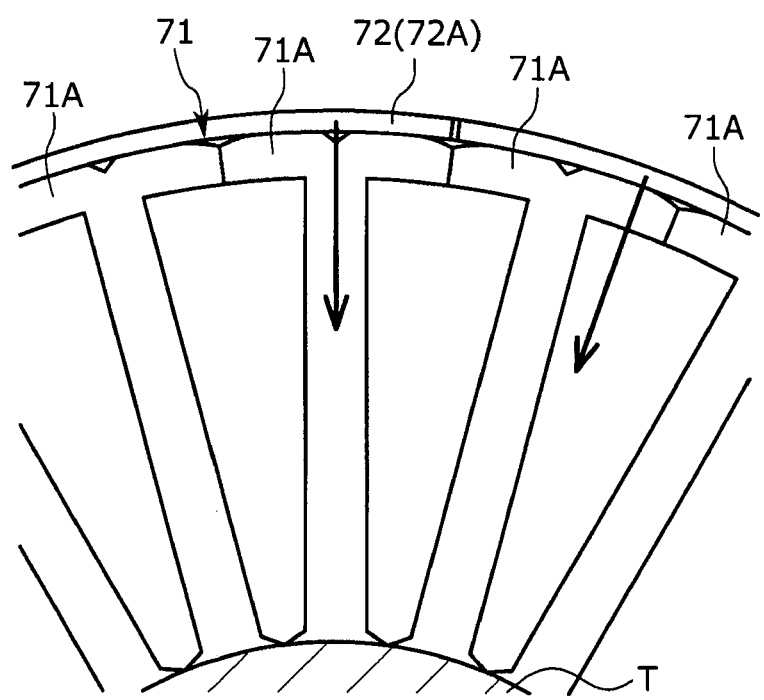

Next, a manufacturing method of a split core stator 7, which is one application example of the stator manufacturing method described above, will be described with reference to FIG. 13 to FIG. 17. FIG. 13 is a schematic plan view of the split core stator 7, FIG. 14 is a perspective view of a wound yoke 72, FIGS. 15(a) and 15(b) are illustrative views showing a manufacturing process of the split core stator 7, and FIGS. 16(a), 16(b), 17(a), and 17(b) are diagrams illustrating variation examples of a wound yoke 72. While FIG. 14 shows the wound yoke 72 in a state wound around the outer surface of a split core 71, the drawing does not show the split core 71 for convenience of illustration.

The split core stator 7 is configured to include a split core 71 in a circular shape, and the wound yoke 72, as shown in FIG. 13. The split core 71 is formed by core pieces 71A substantially in the shape of letter T circumferentially aligned in a ring shape. The wound yoke 72 is a circular metal plate arranged around the outer surface of the split core 71. As a comparative example, the split core stator 7 could be configured by press-fitting the wound yoke 72 pre-formed in a cylindrical shape to the split core 71 that has been temporarily assembled from core pieces 71A circumferentially arranged in a ring shape. However, this procedure entails a risk that the split core 71 may collapse (more precisely, the core pieces 71A may be disjointed) when the wound yoke 72 is press-fitted to the temporarily assembled split core 71. Adopting a structure similar to the first auxiliary yoke 22 or second auxiliary yoke 6 described above in the wound yoke 72 will allow easy attachment of the wound yoke 72 around the outer surface of the temporarily assembled split core 71, which in turn will enable easy assembling of the split core stator 7.

More specifically, the wound yoke 72 having the same structure as that of the first auxiliary yoke 22 will have a wound yoke body part 72A in a band shape, with a protrusion 72B at one end and a recess 72C at the other end, as shown in FIG. 14. The wound yoke body part 72A has the same structure as that of the first auxiliary yoke body part 22A described above, and is configured such that its long sides have substantially the same length as the circumferential length (length in the circumferential direction) of the outer surface of the split core 71. The protrusion 72B has the same structure as that of the first auxiliary yoke protrusion 22B described above, and the recess 72C has the same structure as that of the first auxiliary yoke recess 22C described above.

A wound yoke 72 having the configuration as described above can be arranged on the outer surface of the split core 71 by substantially the same procedure as that by which the first auxiliary yoke 22 is arranged on the outer surface of the main yoke 21 in the first embodiment. More specifically, first, the split core 71 is temporarily assembled, by arranging the core pieces 71A along the circumferential direction in a ring shape as shown in FIG. 15(a). The core pieces 71A can be readily arranged in a circular shape by setting a jig T having a columnar shape in the center of the core (at the position where it contacts the inner surfaces of the core pieces 71A), and arranging the core pieces 71A around the outer circumferential surface of this jig T. After that, the wound yoke body part 72A of the wound yoke 72 is wound around the outer surface of the temporarily assembled split core 71 as shown in FIG. 15(b). With the above-mentioned jig T maintained in the core center, the wound yoke 72 can be wound around while circularity of the split core 71 is kept favorably.

Once the wound yoke 72 is wound around the outer surface of the split core 71, the protrusion 72B and the recess 72C abut on each other in the circumferential direction. The insertion step is performed once this state is achieved, in which the wound yoke 72 is pulled radially toward the center to insert the protrusion 72B into the recess 72C. This causes the distal end of the protrusion 72B to pass through the insertion part 223 and enter the deformation part 224 of the recess 72C in the same procedure as that shown in FIG. 5A. A pressing step is performed thereafter, wherein the distal end of the protrusion 72B is pressed against the inner edges of the deformation part 224 of the recess 72C to compress the distal end of the protrusion 72B in the same procedure as that shown in FIG. 5(b). In this way, similarly to the situation shown in FIG. 5(c), the distal end of the protrusion 72B is deformed inside the deformation part 224 of the recess 72C and forms the spread part 226, which makes pressure contact with the edge surfaces at both axial ends of the deformation part 224. Thus, the protrusion 72B is engaged with the recess 72C reliably and firmly. The wound yoke 72 is assembled to the split core 71 this way. In a compression step, the wound yoke body part 72A is pulled radially toward the center, so that the core pieces 71A positioned inside the wound yoke body part 72A are pressed radially toward the center. Therefore, each of the core pieces 71A is pressed against the outer circumferential surface of the jig T having a columnar shape, and the circularity of the split core 71 can consequently be improved even more.

Figure 16:
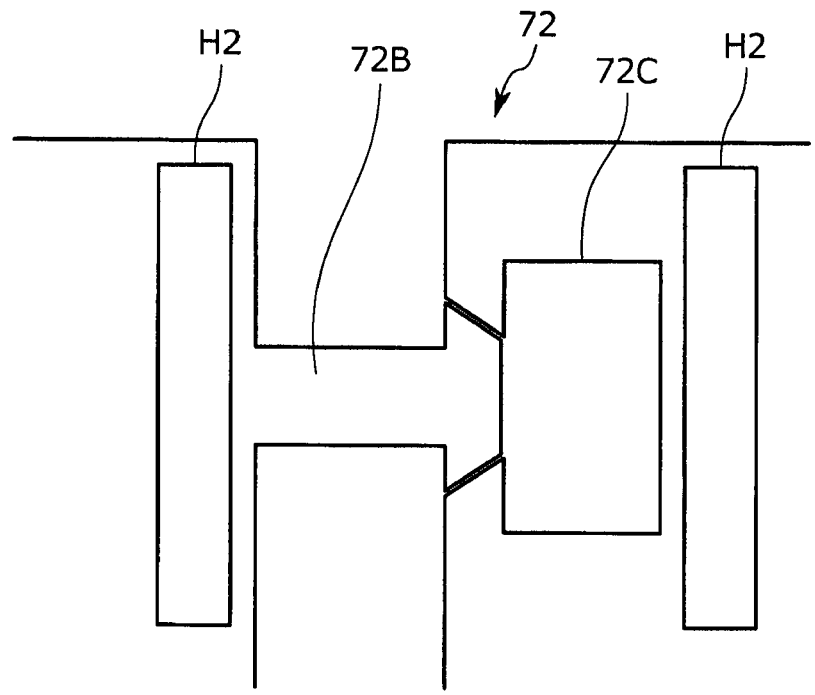
FIG. 16 is diagrams illustrating a first variation example of the wound yoke.
Figure 16:
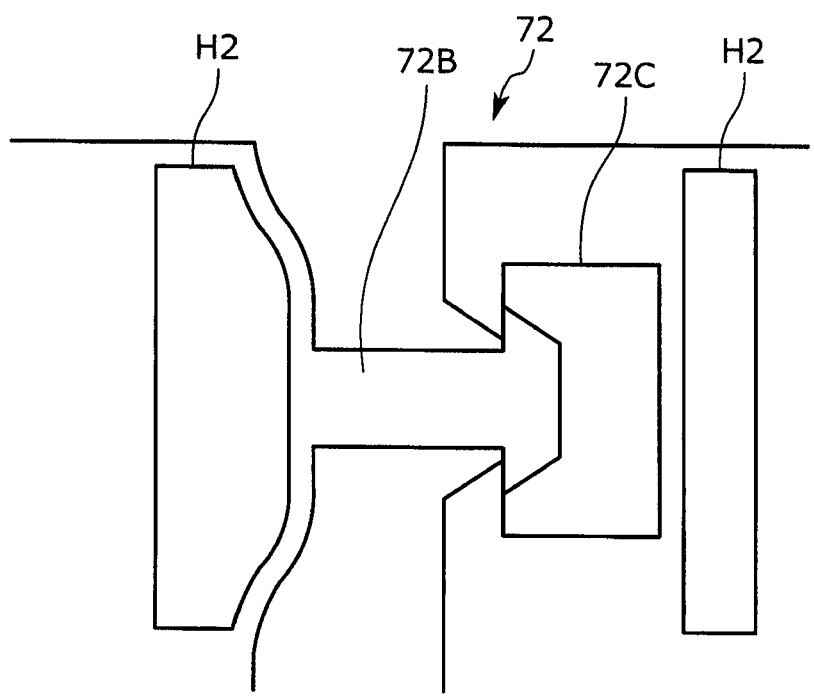

The respective shapes of the protrusion 72B and the recess 72C are not limited to those similar to the shapes of the first auxiliary yoke protrusion 22B and the first auxiliary yoke recess 22C of the first embodiment and may have other shapes. To give one example, the protrusion 72B and the recess 72C may engage with each other by a snap-fit configuration as shown in FIG. 16. Namely, both axial ends at the distal end of the protrusion 72B may protrude in a pawl shape, whereas the insertion part 223 of the recess 72C may have a tapered shape corresponding to the distal end shape of the protrusion 72B, as shown in FIG. 16(a). With this configuration, when the wound yoke 72 is pulled radially toward the center to insert the protrusion 72B into the recess 72C, the distal end of the protrusion 72B pushes apart the insertion part 223 of the recess 72C as it enters into the deformation part 224 of the recess 72C, after which the pushed-apart insertion part 223 returns to its original size as shown in FIG. 16(b). Thus, the protrusion 72B engages with the recess 72C by a snap-fit configuration.

The method of assembling the wound yoke 72 to the split core 71 is not limited to winding a wound yoke body part 72A having a band-shape around the outer surface of the split core 71. The method shown in FIG. 17 may also be used. In the method shown in FIG. 17, the wound yoke 72 is assembled to the split core 71 such that the split core 71 is inserted (more precisely, loosely fitted) into the wound yoke body part 72A that has been rolled into a cylindrical shape in advance, after which the inner diameter of the wound yoke body part 72A is reduced to be equal to the diameter of the outer surface of the split core 71.

Figure 17:
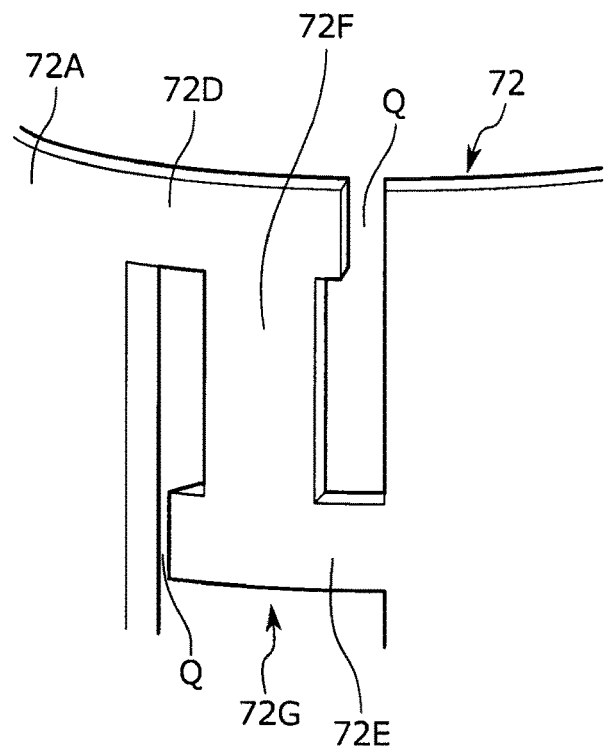
FIG. 17 is diagrams illustrating a second variation example of the wound yoke.
Figure 17:
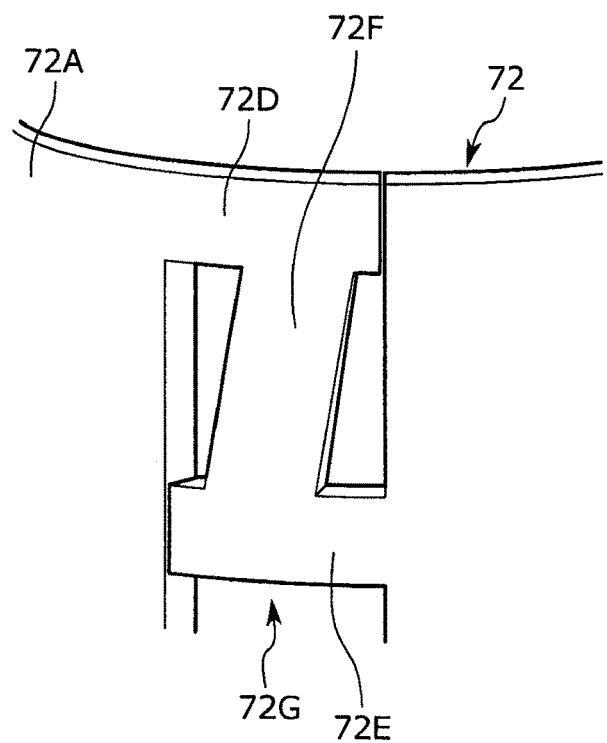

More specifically, in the method shown in FIG. 17, the wound yoke 72 has a gap section 72G at a circumferential location of the wound yoke body part 72A in a cylindrical shape as shown in FIG. 17(a), this gap section including a first extension 72D, a second extension 72E, and a center connector 72F. The first extension 72D is a quadrate portion extending from one circumferential end to the other end of the gap section 72G. The second extension 72E is a quadrate portion extending from the other circumferential end to the one end of the gap section 72G. The first extension 72D and second extension 72E are arranged in symmetry, axially separated from each other, and positioned such as to circumferentially partly overlap each other. There is a clearance Q each between the distal end of the first extension 72D and the other circumferential end of the gap section 72G, and between the distal end of the second extension 72E and the one circumferential end of the gap section 72G. The widths (lengths in the circumferential direction) of these two clearances Q are the same. When attaching the wound yoke 72 to the split core 71, the inner diameter of the wound yoke body part 72A is reduced by a length corresponding to the clearances Q as shown in FIG. 17(b). Namely, as the clearances Q are removed, the circumferential length of the gap section 72G is shortened, and the inner diameter of the wound yoke body part 72A is reduced by that amount.

The center connector 72F is present between the first extension 72D and the second extension 72E in the axial direction and extend long along the axial direction. This center connector 72F is substantially rectangular as viewed from the side as shown in FIG. 17(a) before the wound yoke 72 is assembled to the split core 71. When the diameter of the wound yoke body part 72A is reduced to attach the wound yoke 72 to the split core 71, the center connector 72F undergoes deformation (deflects) such that one side at one axial end of the center connector 72F is shifted relative to the side at the other end as shown in FIG. 17(b). In other words, the center connector 72F deforming from the state shown in FIG. 17(a) to the state shown in FIG. 17(b) causes the diameter of the wound yoke body part 72A to be reduced by an amount corresponding to the clearances Q mentioned above. A wound yoke 72 having the configuration described above can easily be attached to a temporarily assembled split core 71 (without collapsing the split core 71).

A comparative example will be described below. According to the comparative example, a frame structure of a DC motor includes a rotor core enclosed in a frame having a cup shape (yoke), and an auxiliary frame having a ring shape is arranged on the cylindrical outer surface of this frame (yoke). This configuration allows formation of a frame having a small thickness as a whole and yet having a necessary thickness in a section where a larger thickness is required for forming a magnetic circuit, with an auxiliary frame (auxiliary yoke) wound around this section.

The technique of the comparative example thus allows the thickness to be increased only in a section where it is necessary as part of a magnetic circuit while keeping the thickness of other parts small, by using an auxiliary frame (auxiliary yoke). This enables an attempt to reduce the material cost and the weight of the frame (yoke). In such technique, the auxiliary frame (hereinafter referred to as "auxiliary yoke") is fixedly fitted to a frame having a cup shape (hereinafter referred to as "main yoke") by press-fitting or bonding.

However, according to an investigation conducted by the inventors, the method of attaching an auxiliary yoke to a main yoke by press-fitting causes deformation in the main yoke by the force applied during the press-fitting, resulting in a change in inner diameter of the main yoke. The force applied during press-fitting also causes the coating on the main yoke or auxiliary yoke to peel. Moreover, for the press-fitting of the auxiliary yoke, the inner and outer diameters of the main yoke need to be finished with high precision, which leads to high manufacturing cost. The auxiliary yoke is also required to have precise inner and outer diameters, which increases the manufacturing cost. The method of attaching the auxiliary yoke to the main yoke by bonding entails a risk of the auxiliary yoke coming off due to an insufficient bonding force. Moreover, stray adhesive may cause deterioration in appearance. Other possible mounting methods include welding or drawing. The former entails risks of a change in inner diameter of the main yoke due to thermal effects, or corrosion of welded spots. The latter has risks of lowered precision of the main yoke inner diameter caused by anisotropy of the material, and of increased difficulty in positioning the blank with high precision. The latter method also entails a problem of machine oil accumulation between the auxiliary yoke and the main yoke. Under these circumstances, the development of a technique that does not cause a change in the inner diameter of the main yoke, or require too high a level of precision for the inner and outer diameters, has been sought after.

In contrast to the comparative example, the present disclosure provides a stator configured to reduce the influence of attachment of an auxiliary yoke on a main yoke when the auxiliary yoke is attached to the main yoke, and provides a manufacturing method of the stator.

The present disclosure also provides a stator that allows a reduction of accuracy requirements for inner and outer diameters of the main yoke and auxiliary yoke and advantageous in terms of manufacturing cost, and provides a manufacturing method of the stator.

According to the present disclosure, a stator has a cylindrical shape with a bottom, forms a rotating electric machine, and houses an armature secured to a rotating shaft. The stator includes: a main yoke having a cylindrical shape with a bottom; an auxiliary yoke having a band shape and arranged on an outer circumferential wall surface or an inner circumferential wall surface of the main yoke; and a field magnet arranged inside the main yoke and radially facing an outer surface of the armature. The auxiliary yoke is arranged along a circumferential direction of the outer circumferential wall surface or the inner circumferential wall surface of the main yoke. The auxiliary yoke has at least one protrusion formed at one end thereof. The auxiliary yoke has at least one recess formed at another end thereof. The recess faces and engages with the protrusion in the circumferential direction in a state where the auxiliary yoke is arranged along the circumferential direction of the outer circumferential wall surface or the inner circumferential wall surface of the main yoke.

In the present disclosure, the auxiliary yoke is configured such that it is arranged along the circumferential direction of the outer circumferential wall surface or inner circumferential wall surface of the main yoke, with the protrusion and recess respectively formed at one circumferential end and the other circumferential end of the auxiliary yoke being caused to circumferentially abutting on and engaged with each other.

Therefore, when setting the auxiliary yoke, no large physical force is exerted as would be by press-fitting or the like, so that adverse effects to the main yoke (such as changes in inner diameter, peeling of coating) can be prevented effectively. Adverse effects by a chemical force caused by welding (such as thermal denaturation, corrosion, changes caused by anisotropy) can also be prevented effectively, and there will be no risk of oil accumulation that would be caused by drawing. There is no risk of separation which could occur during bonding, or deterioration in appearance, either. The engaging configuration is advantageous in terms of manufacturing cost because it allows reduction of the accuracy requirements for the inner and outer diameters of the main yoke and auxiliary yoke.

In this case, for more specific configuration, the protrusion may engage with the recess in a state where the protrusion is in pressure contact with a part of the recess. The engaging stiffness is enhanced.

Further, for more specific configuration, the recess may include a first hole close to an opening of the recess, and a second hole which is spaced more from the opening than the first hole is from the opening, the second hole communicating with the first hole. A size of the first hole in an axial direction may be smaller than a size of the second hole in the axial direction. A distal end portion of the protrusion may be compressed and have a spread part expanded in the axial direction. The protrusion may engage with the recess in a state where a surface of the spread part facing a base of the protrusion is in contact with a step formed between the first hole and the second hole. This configuration causes the protrusion to firmly engage with the recess and allows for effective prevention of separation of the protrusion from the recess.

Further, for more specific configuration, a size of an opening of the recess in an axial direction may be smaller than a size of an inner part of the recess in the axial direction. A distal-end side of the protrusion may be positioned in the inner part of the recess, and a distal end of the protrusion may be in pressure contact with a part of a peripheral edge defining the inner part of the recess. A size of a base side of the protrusion in the axial direction may be smaller than a size of the distal-end side of the protrusion in the axial direction, and the base side may be positioned in the opening of the recess. This configuration allows for effective prevention of separation of the protrusion from the recess and ensures effective engagement after engaging.

When a buffer hole is formed in at least one of a vicinity of the protrusion and a vicinity of the recess, the buffer hole can be used as a relief hole for relieving an engaging force exerted from the protrusion engaging with the recess, so that the influence of the engaging force on other parts can be reduced.

According to the present disclosure, a stator has a cylindrical shape with a bottom, forms a rotating electric machine, and houses an armature secured to a rotating shaft. The stator includes: a main yoke having a cylindrical shape with a bottom; an auxiliary yoke arranged on an outer circumferential wall surface or an inner circumferential wall surface of the main yoke, the auxiliary yoke including an auxiliary yoke body part that is a band-shaped plate member, and having a cylindrical shape by one end and another end of the auxiliary yoke body part being coupled together; and a field magnet arranged inside the main yoke and radially facing an outer surface of the armature. The auxiliary yoke is arranged along a circumferential direction of the outer circumferential wall surface or the inner circumferential wall surface of the main yoke. The one end and the other end of the auxiliary yoke body part are coupled together in a circumferential direction via a rotatable fastening part which is rotatable to cause one of the ends to come close to or move away from another of the ends. The auxiliary yoke is in pressure contact with the inner circumferential wall surface or the outer circumferential wall surface of the main yoke.

In this case, for more specific configuration, the rotatable fastening part may include: an action part having a flat plate shape; a one-side connecting part that connects one point of the action part with the one end of the auxiliary yoke body part; and an other-side connecting part that connects another point of the action part with the other end of the auxiliary yoke body part. The one and other points may be arranged at point symmetrical positions about a center of the action part. With this configuration, the auxiliary yoke can be mounted to the main yoke only by rotating the rotatable fastening part. Various advantageous effects similar to the engagement between the protrusion and the recess can be achieved.

Further, for more specific configuration, the protrusion and the recess, or the rotatable fastening part may be provided at or near a position radially overlapping with a position of the center of gravity of the field magnet. This region of the field magnet does not contribute as a magnetic passage. The engaging portions of the protrusion and the recess, or the rotatable fastening part may be positioned at this region. Accordingly, adverse influence of a magnetic loss can be prevented.

A manufacturing method of a stator, according to the present disclosure, is a method for manufacturing a stator configured to include: a main yoke having a cylindrical shape with a bottom; an auxiliary yoke having a band shape and arranged on an outer circumferential wall surface or an inner circumferential wall surface of the main yoke; and a field magnet arranged inside the main yoke and radially facing an outer surface of an armature. The stator houses the armature secured to a rotating shaft. The method includes a placing step, an inserting step and a pressing step. The placing step includes rolling the auxiliary yoke having a band shape and including at least one protrusion at one end thereof and at least one recess at another end thereof to engage with the protrusion. The auxiliary yoke is rolled along the outer circumferential wall surface or the inner circumferential wall surface of the main yoke so that the protrusion and the recess abut on each other along a circumferential direction of the outer circumferential wall surface or the inner circumferential wall surface of the main yoke. The inserting step includes inserting the protrusion into the recess. The pressing step includes engaging the protrusion with the recess via deformation of the protrusion by pressing a distal end portion of the protrusion against a circumferential end portion that is a part of the recess.

In this case, the inserting step and the pressing step may be performed in a state where the main yoke and the auxiliary yoke wound around the outer circumferential wall surface of the main yoke are housed in an enclosure space formed between two split molds. The inserting of the protrusion into the recess and the engaging of the protrusion with the recess may be performed by the two split molds sandwiching and compressing the main yoke and the auxiliary yoke in a radial direction of the main yoke in the enclosure space. Accordingly, the auxiliary yoke can readily be wound around the outer circumferential wall surface of the main yoke, and the protrusion can be readily engaged with the recess, by radially compressing the main yoke while sandwiching the main yoke and the auxiliary yoke between the two split molds.

In the above-described method, an absorption hole may be formed in the protrusion, and the engaging of the protrusion with the recess at the pressing step may include deforming the absorption hole to deform the distal end portion of the protrusion in the recess.

The auxiliary yoke having a band shape is thus configured such that it is mounted by being wound around so that the protrusion and the recess are caused to circumferentially abut on and engaged with each other. Similar advantageous effects as those described above can thus be achieved.

In the pressing step, the distal end of the protrusion is brought into pressure contact with the recess, and engaged with the recess, while deforming (compressing) the recess. Thus they can be engaged with each other only by applying a force in a circumferential direction. Since the protrusion has deformed (compressed) inside the recess after the pressing step, the protrusion is effectively prevented from separating from the recess. The protrusion can thus be engaged with the recess easily and reliably.

Since an absorption hole is formed in the distal end portion of the protrusion, this absorption hole provides cushion when the protrusion is deformed (compressed) during the pressing step, whereby chipping of the protrusion can be prevented. Also, because of this absorption hole, the force required for deforming (compressing) the protrusion can be reduced.

Furthermore, a manufacturing method of a stator, according to the present disclosure, is a method for manufacturing a stator configured to include: a main yoke having a cylindrical shape with a bottom; an auxiliary yoke arranged on an outer circumferential wall surface or an inner circumferential wall surface of the main yoke; and a field magnet arranged inside the main yoke and radially facing an outer surface of an armature. The stator houses the armature secured to a rotating shaft. The method includes a placing step and a pressure step. The placing step includes attaching the auxiliary yoke to either the outer circumferential wall surface or the inner circumferential wall surface of the main yoke, the auxiliary yoke has a cylindrical shape in which a rotatable fastening part coupling one end and another end of an auxiliary yoke body part that is a band-shaped plate member, and the rotatable fastening part is rotatable to cause one of the ends to come close to or move away from another of the ends. The pressing step includes pressing the auxiliary yoke against the outer circumferential wall surface or the inner circumferential wall surface of the main yoke by rotating the rotatable fastening part to cause one of the ends of the auxiliary yoke body part to come close to or move away from another of the ends.

With this configuration, the auxiliary yoke can be easily mounted to the main yoke only by rotating the rotatable fastening part, and similar advantageous effects as those described above can be achieved.

The stator according to the present disclosure adopts a configuration where the auxiliary yoke is mounted to the main yoke. For the mounting, there is no need of press-fitting, welding, drawing, bonding, and so on. Namely, physical impacts of a large force or chemical influences can be prevented. This effectively prevents changes in inner diameter of the main yoke, peeling of coating, thermal denaturation, corrosion, changes by anisotropy, oil accumulation, separation of the auxiliary yoke, appearance defects, and so on. The engaging configuration, or the configuration in which the rotatable fastening part is rotated to adjust the diameter of the auxiliary yoke, is advantageous in terms of manufacturing cost because it allows reduction of the accuracy requirements for the inner and outer diameters of the main yoke and auxiliary yoke.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A stator comprising:
    a main yoke having a cylindrical shape with a bottom;
    an auxiliary yoke having a band shape and arranged on an outer circumferential wall surface or an inner circumferential wall surface of the main yoke; and
    a field magnet arranged inside the main yoke and radially facing an outer surface of an armature housed in the main yoke, wherein
    the auxiliary yoke is arranged along a circumferential direction of the outer circumferential wall surface or the inner circumferential wall surface of the main yoke,
    the auxiliary yoke has at least one protrusion formed at one end thereof,
    the auxiliary yoke has at least one recess formed at another end thereof, the recess facing and engaging with the protrusion in the circumferential direction in a state where the auxiliary yoke is arranged along the circumferential direction of the outer circumferential wall surface or the inner circumferential wall surface of the main yoke;
    the protrusion engages with the recess in a state where the protrusion is in pressure contact with a part of the recess,
    the recess includes a first hole close to an opening of the recess, and a second hole which is spaced more from the opening than the first hole is from the opening, the second hole communicating with the first hole,
    a size of the first hole in an axial direction is smaller than a size of the second hole in the axial direction,
    a distal end portion of the protrusion is compressed and has a spread part expanded in the axial direction, and
    the protrusion engages with the recess in a state where a surface of the spread part facing a base of the protrusion is in contact with a step formed between the first hole and the second hole.

2. The stator according to claim 1, wherein
    a size of an opening of the recess in the axial direction is smaller than a size of an inner part of the recess in the axial direction,
    a distal-end side of the protrusion is positioned in the inner part of the recess, and the distal end portion of the protrusion is in pressure contact with a part of a peripheral edge defining the inner part of the recess, and
    a size of the base of the protrusion in the axial direction is smaller than a size of the distal-end side of the protrusion in the axial direction, and the base of the protrusion is positioned in the opening of the recess.

3. The stator according to claim 1, wherein a buffer hole is formed in at least one of a vicinity of the protrusion and a vicinity of the recess.

4. The stator according to claim 1, wherein the protrusion and the recess are provided at or near a position radially overlapping with a position of the center of gravity of the field magnet.

* * * * *